US011264935B2

United States Patent
Combes et al.

(10) Patent No.: US 11,264,935 B2
(45) Date of Patent: Mar. 1, 2022

(54) VARIABLE SPEED DRIVE FOR THE SENSORLESS PWM CONTROL OF AN AC MOTOR BY EXPLOITING PWM-INDUCED ARTEFACTS

(71) Applicant: Schneider Toshiba Inverter Europe SAS, Pacy sur Eure (FR)

(72) Inventors: Pascal Combes, Vernon (FR); Dilshad Surroop, Saint-Denis (FR); Philippe Martin, Paris (FR); Pierre Rouchon, Meudon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 17/031,223

(22) Filed: Sep. 24, 2020

(65) Prior Publication Data
US 2021/0091703 A1   Mar. 25, 2021

Related U.S. Application Data

(60) Provisional application No. 62/905,663, filed on Sep. 25, 2019.

(30) Foreign Application Priority Data

Jul. 2, 2020 (EP) .................................... 20305748

(51) Int. Cl.
*H02P 27/08* (2006.01)
*H02P 23/14* (2006.01)

(52) U.S. Cl.
CPC ............ *H02P 27/085* (2013.01); *H02P 23/14* (2013.01)

(58) Field of Classification Search
CPC ........ H02P 27/085; H02P 23/14; H02P 21/18; H02P 21/04; H02P 23/12; H02P 27/08;
(Continued)

(56) References Cited

U.S. PATENT DOCUMENTS 9,252,698 B2 *   2/2016   Kume ...................... H02P 6/08

FOREIGN PATENT DOCUMENTS

DE   102014106667 A1   4/2015

OTHER PUBLICATIONS

Wang C et al: "A Novel Approach for Sensorless Control of PM Machines Down to Zero Speed Without Signal Injection or Special PWM Technique", IEEE Transactions on Power Electronics, Institute of Electrical and Electronics Engineers, USA, vol. 19, No. 6, Nov. 1, 2004 (Nov. 1, 2004), pp. 1601-1607, XP011121751, ISSN: 0885-8993, DOI: 10.1109/TPEL.2004.836617.
(Continued)

*Primary Examiner* — David Luo
(74) *Attorney, Agent, or Firm* — Locke Lord LLP

(57) ABSTRACT

A variable speed drive comprises an output for delivering a drive voltage to an electric motor, power inverter, a drive controller, and a current sensor. The drive controller includes a PWM generator, a control law module, and a state variable estimator for estimating a state variable of the electric motor. The module computes a target voltage signal based on state variable estimates provided by the estimator and outputs the target voltage signal to the PWM generator. The generator approximates the target voltage signal with a PWM control signal, controls the inverter using the control signal, computes, based on the deviation between the control signal and the target voltage signal, an estimation support signal, and outputs the estimation support signal to the estimator. The estimator estimates a state variable of the motor based on the estimation support signal and the drive current, and outputs the estimate to the module.

12 Claims, 16 Drawing Sheets

(58) Field of Classification Search
CPC .......... H02P 6/183; H02P 23/03; H02P 21/14;
H02P 21/24; H02P 25/026; H02P 2207/05
USPC .................................................. 318/503, 494
See application file for complete search history.

(56) References Cited

OTHER PUBLICATIONS

Extended European Search Report for Appln No. 20305748.4-1202 dated Nov. 10, 2020, 11 pages.

* cited by examiner

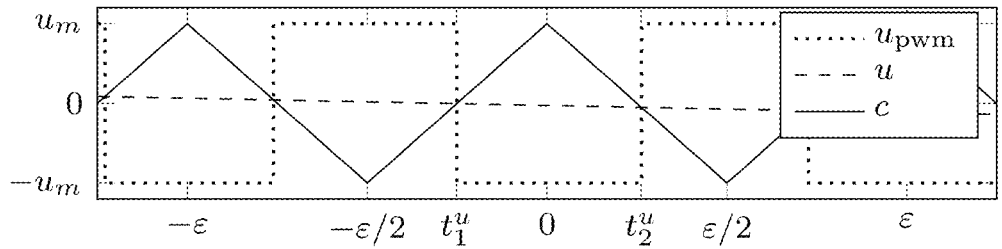
Fig. 3: PWM: $u$ is compared to $c$ to produce $u_{\mathrm{pwm}}$.
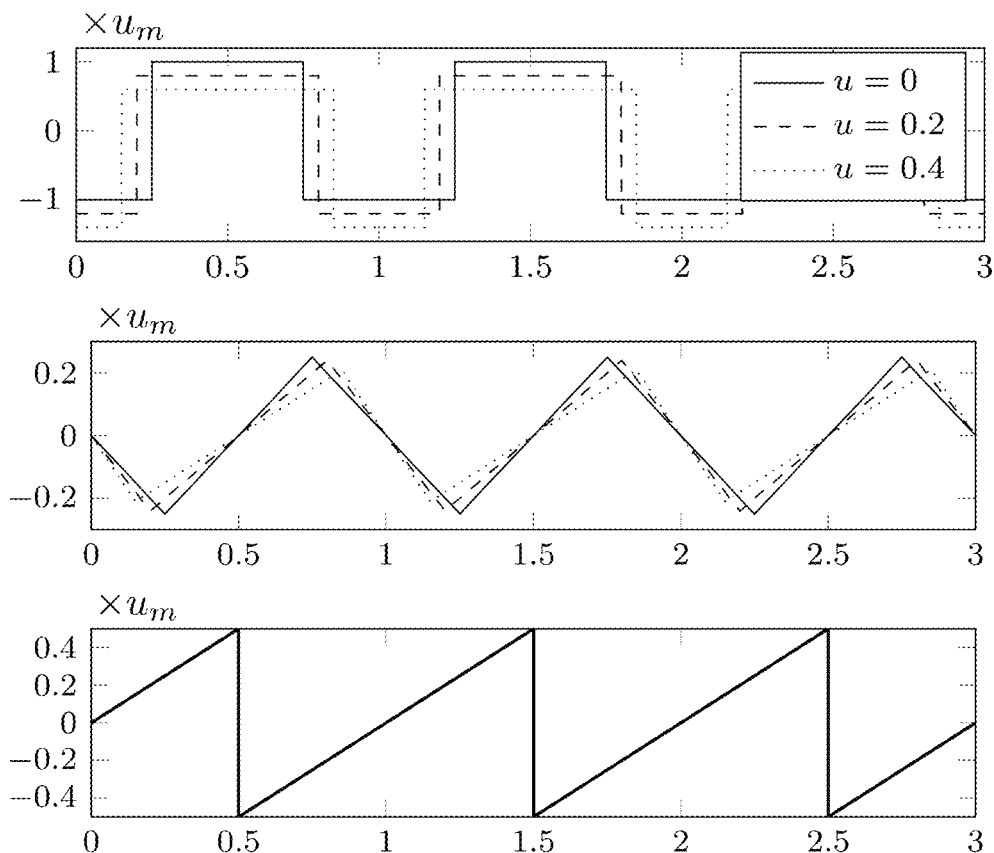
Fig. 4: $s_0(u,\cdot)$ (top) and $s_1(u,\cdot)$ (middle) for $u = 0, 0.2, 0.4$; w (bottom).

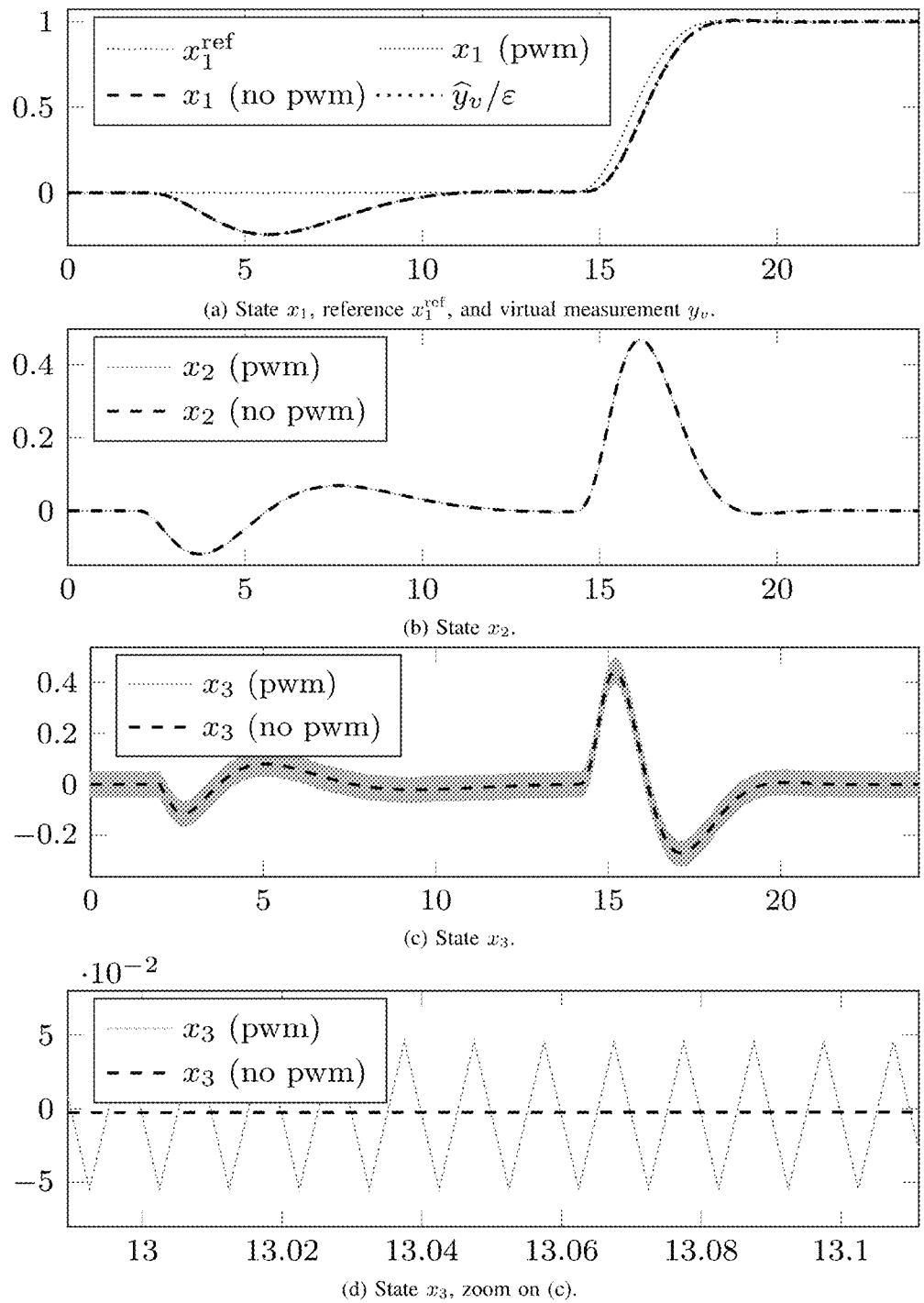
Fig. 5: States $x_1, x_2, x_3$ with ideal and actual control laws.

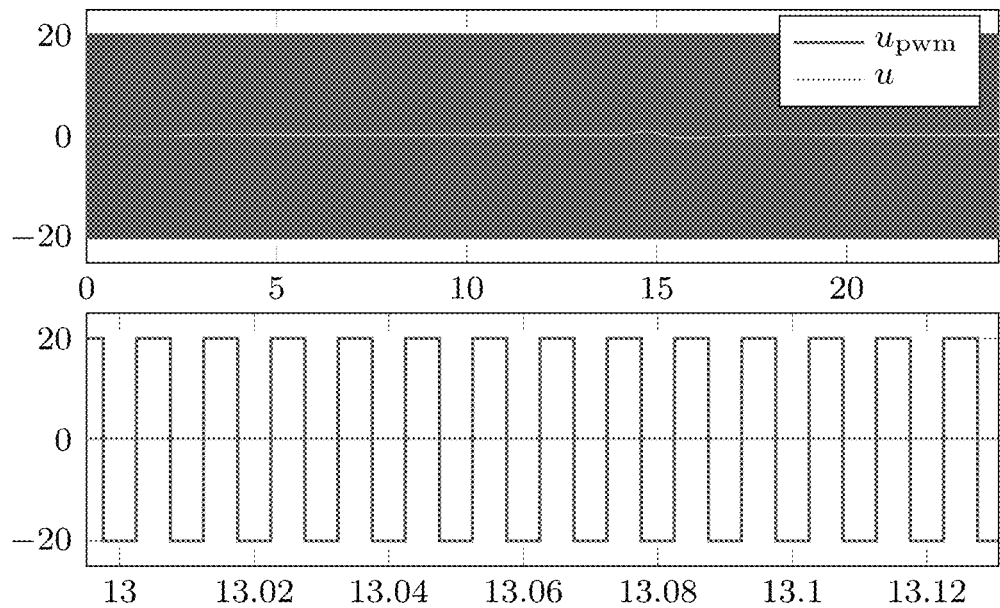
Fig. 6: Control input $u$ and its modulation $u_{\text{pwm}}$; full view (top), zoom (bottom).
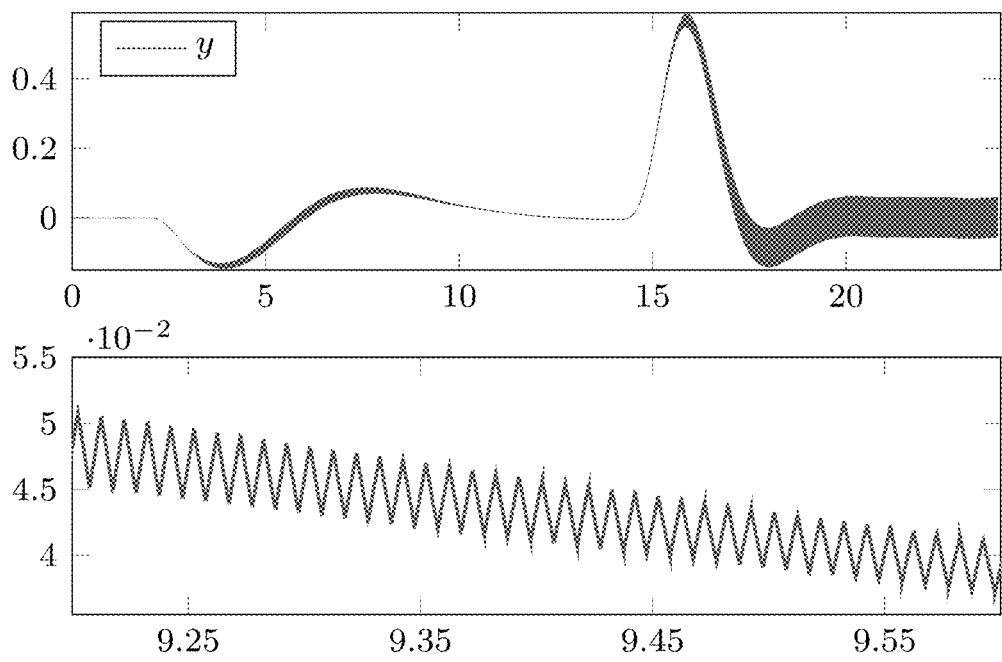
Fig. 7: Measured output $y$ (top); full view (top), zoom (bottom).

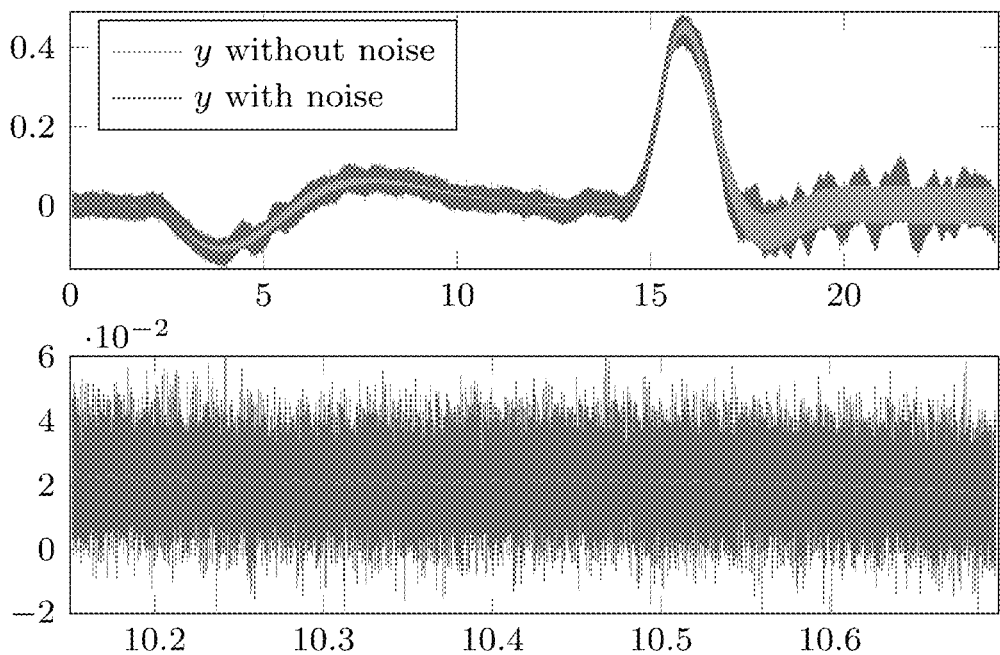
Fig. 8: Measured output $y$ with and without noise; full view (top), zoom (bottom).
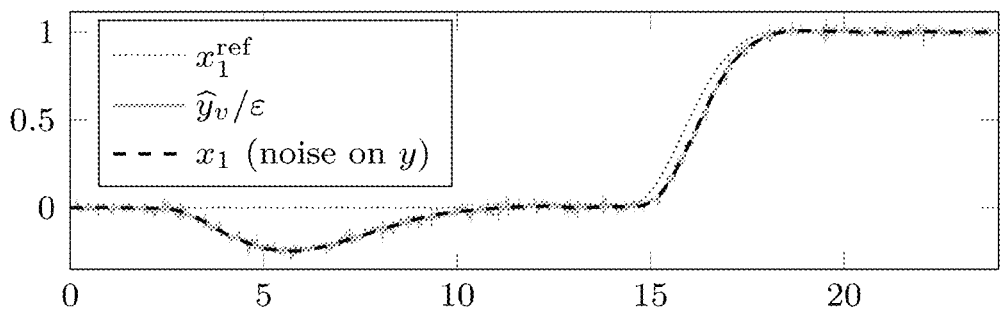
Fig. 9: $x_1^{\text{ref}}$, $x_1$, and $\widehat{y}_v$ in the presence of noise.

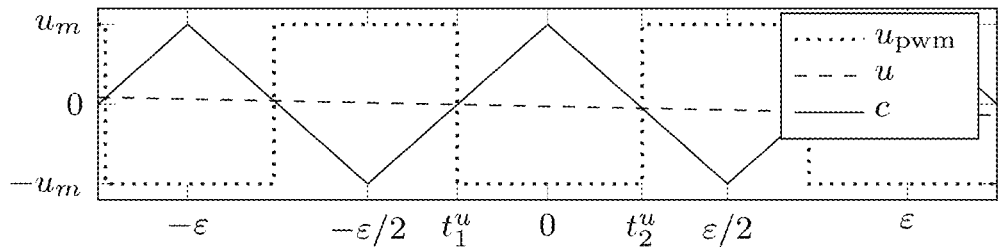
Fig. 10: PWM: $u$ is compared to $c$ to produce $u_{\mathrm{pwm}}$
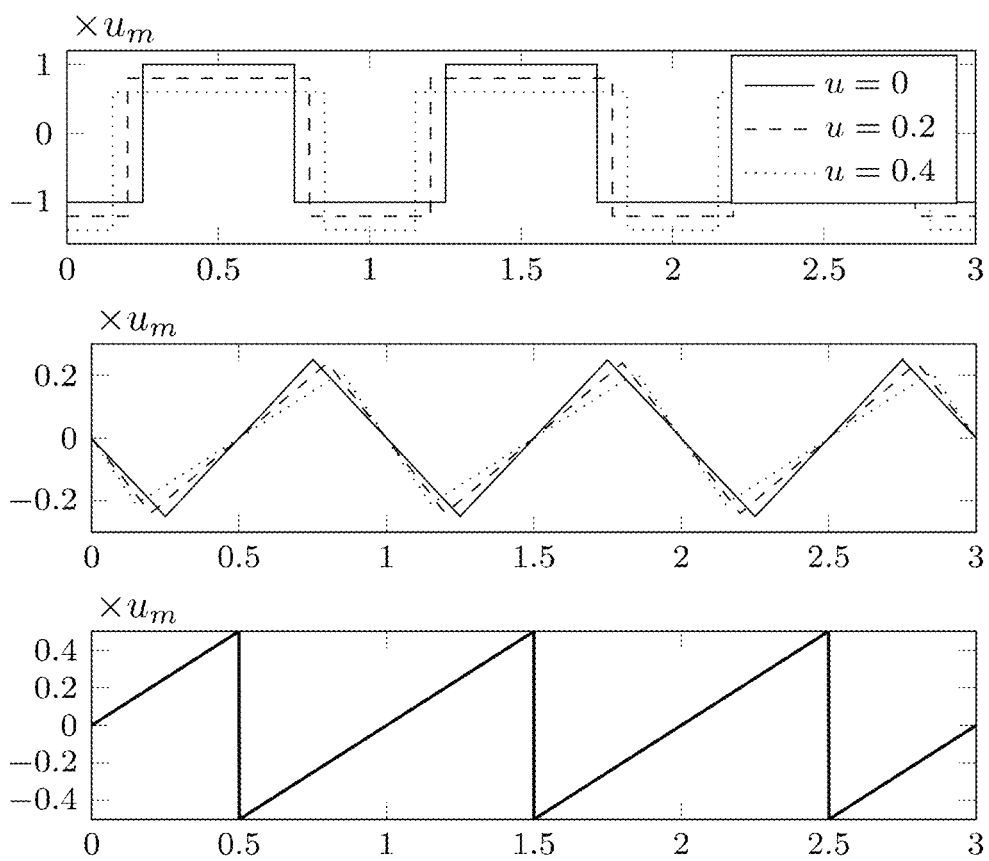
Fig. 11: $s_0(u,\cdot)$ (top) and $s_1(u,\cdot)$ (middle) for $u = 0, 0.2, 0.4$; w (bottom).

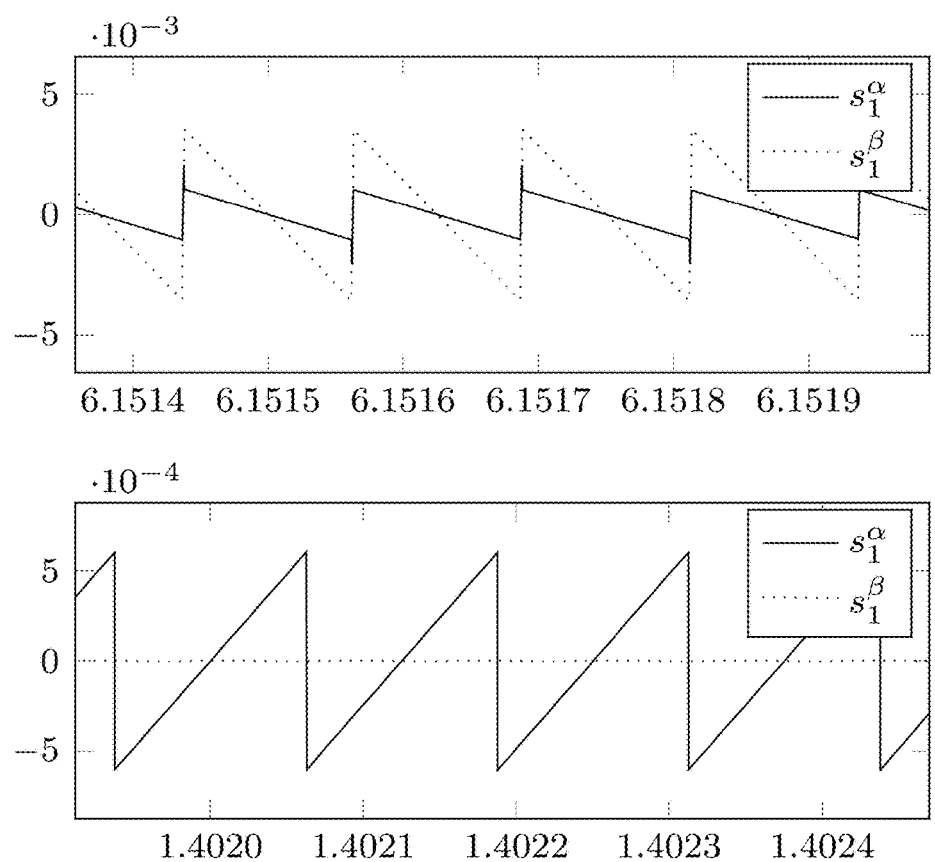
Fig. 12: $s_1^{\alpha\beta}$ for single-carrier PWM (simulation data): nondegenerate (top), degenerate (bottom).

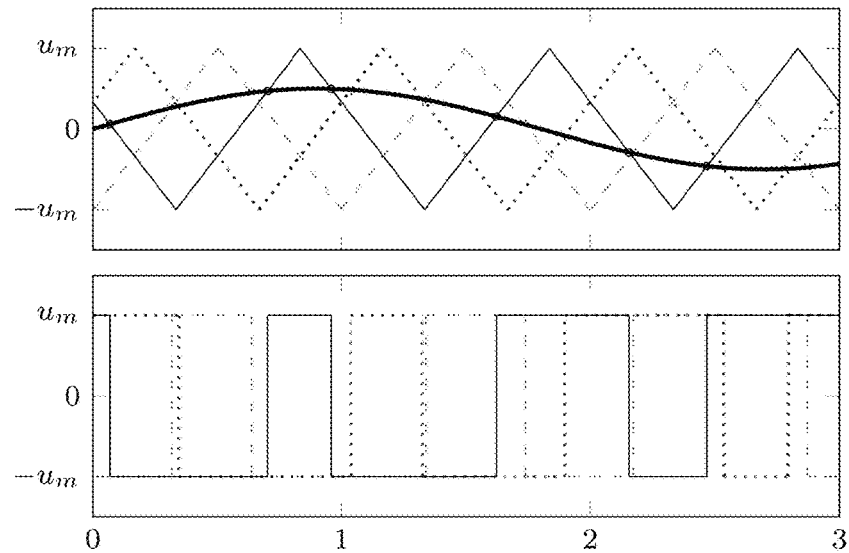
Fig. 13: Interleaved carriers (thinner lines). The same reference (thicker curve) produces different PWM signals.
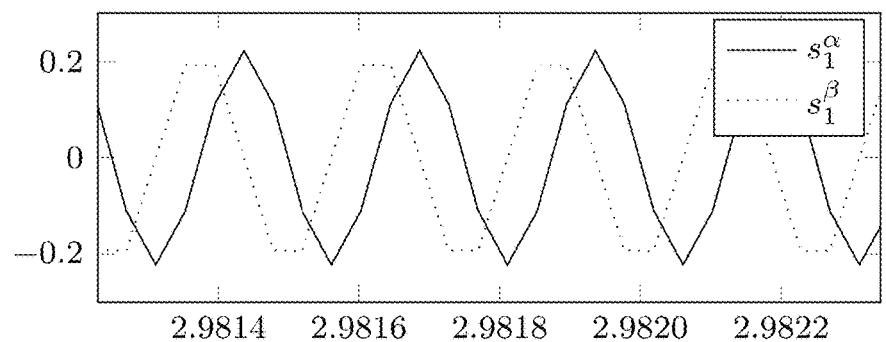
Fig. 14: $s_1^{\alpha\beta}$ for interleaved PWM (simulation data).

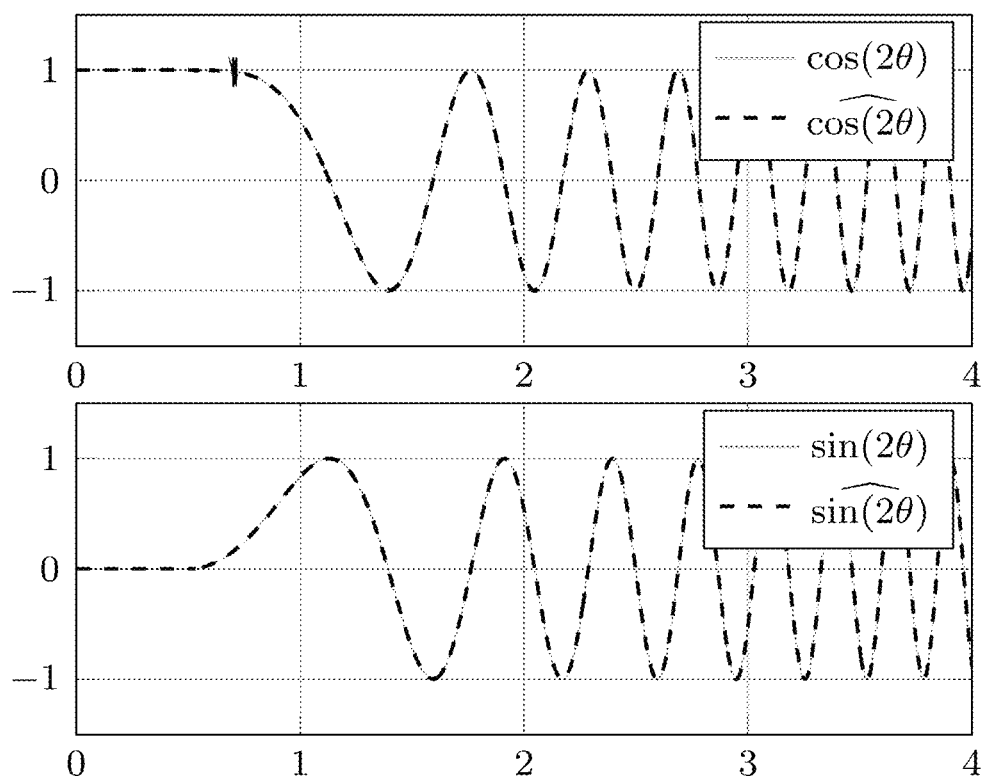
Fig. 15: Reconstruction of $\cos 2\theta$ and $\sin 2\theta$ (simulation).

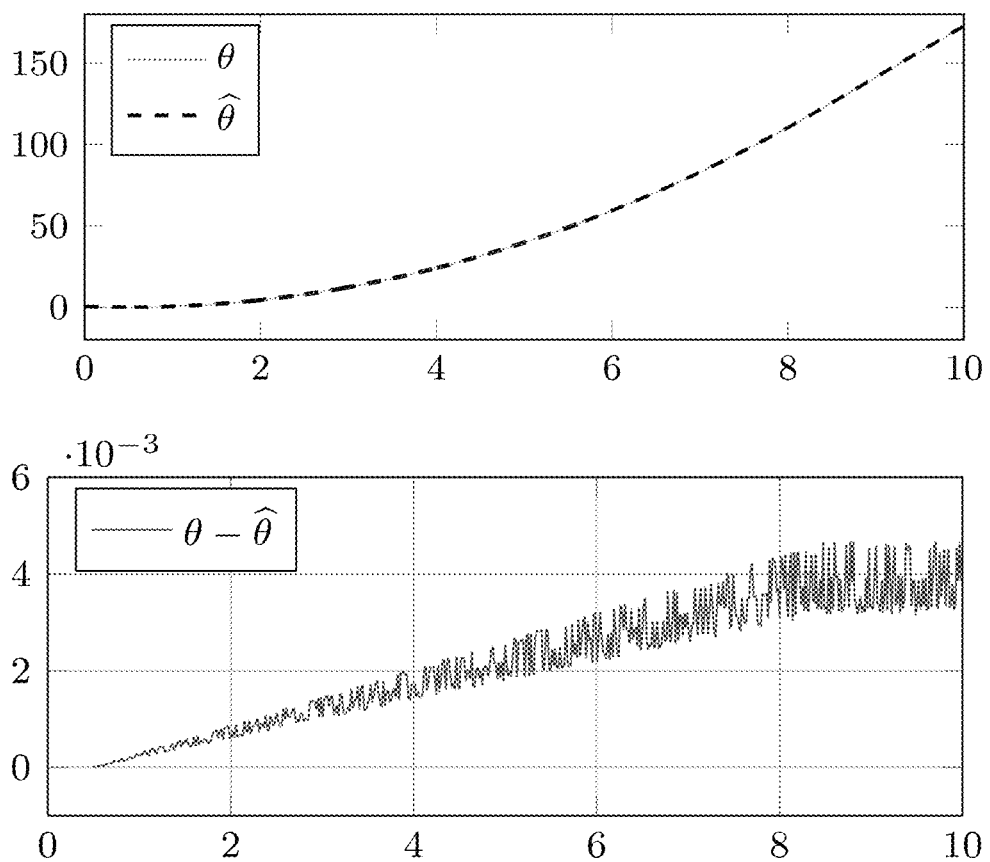
Fig. 16: Reconstruction of $\theta$ in rad (simulation).

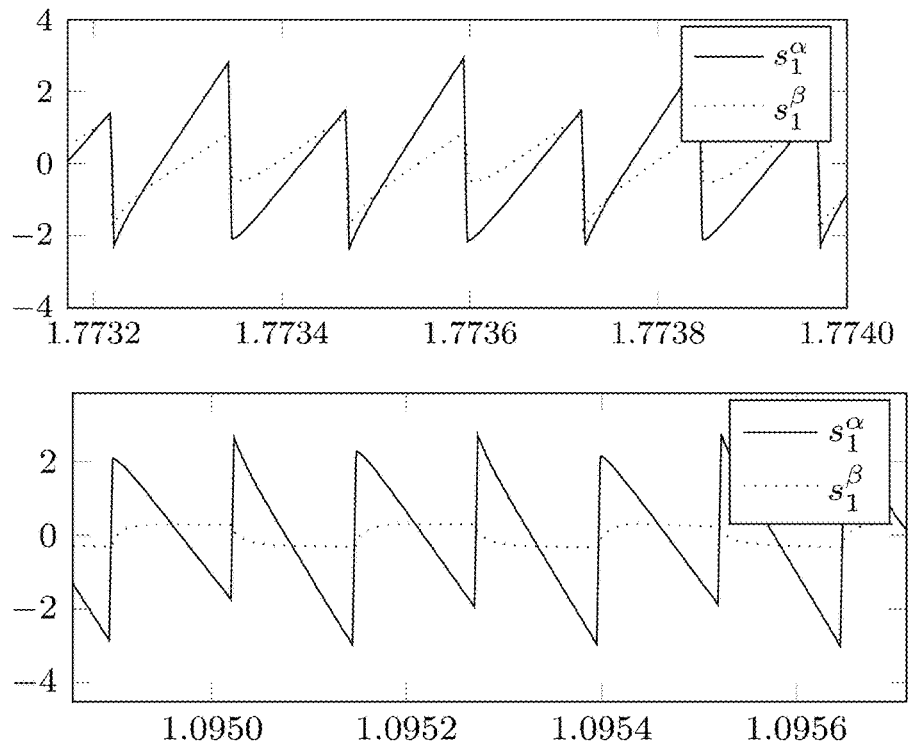
Fig. 17: $s_1^{\alpha\beta}$ for single-carrier PWM (experimental data): nondegenerate (top), degenerate (bottom).
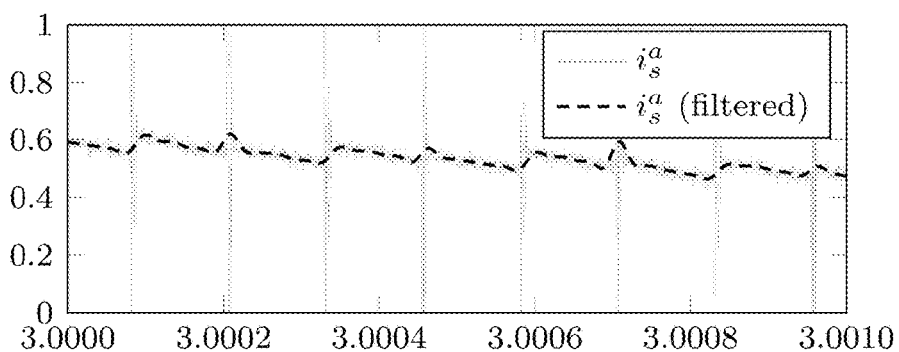
Fig. 18: Measured current $i_s^a$ and its filtered version (experimental data).

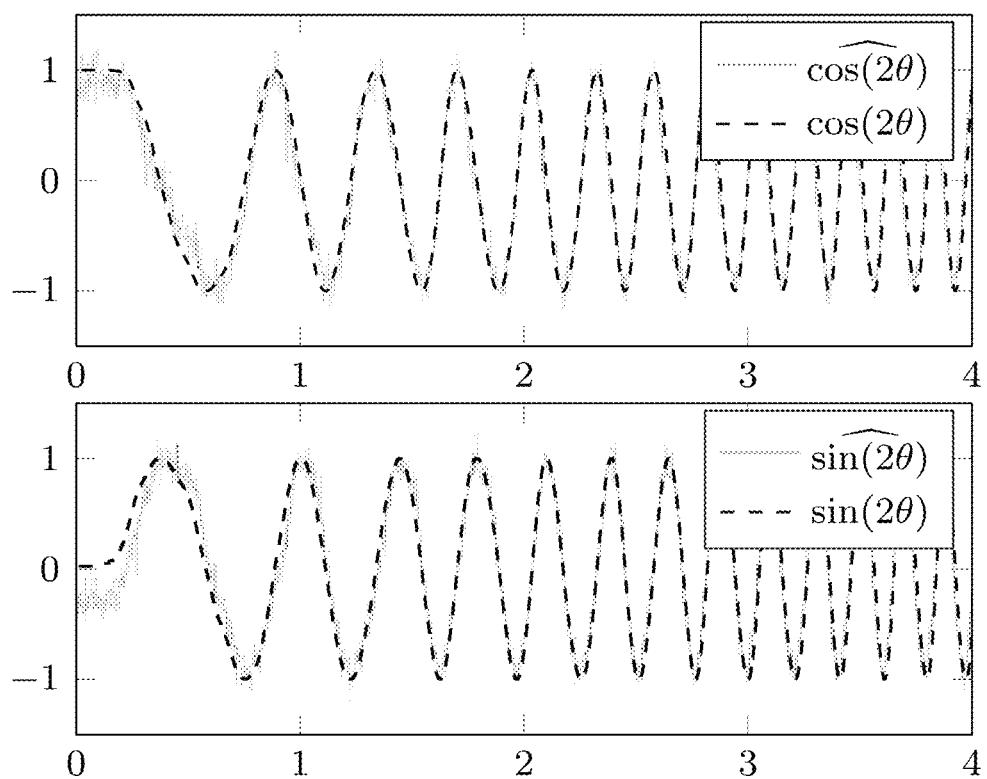
Fig. 19: Reconstruction of $\cos 2\theta$ and $\sin 2\theta$ (experiment).

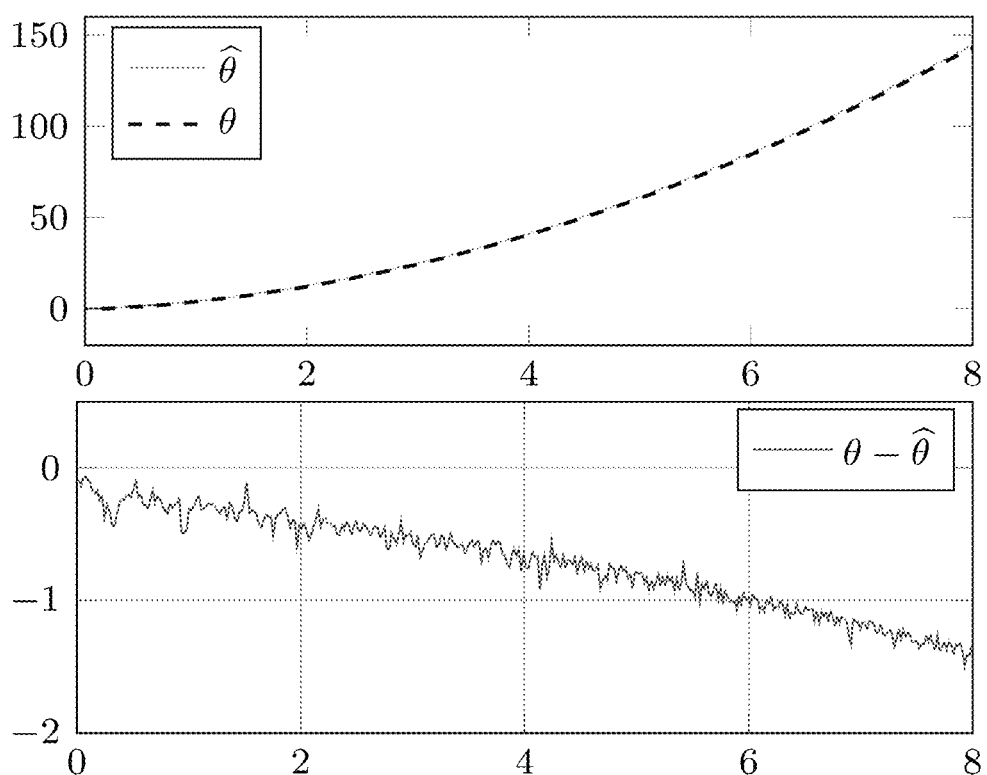
Fig. 20: Reconstruction of $\theta$ in rad (experiment).

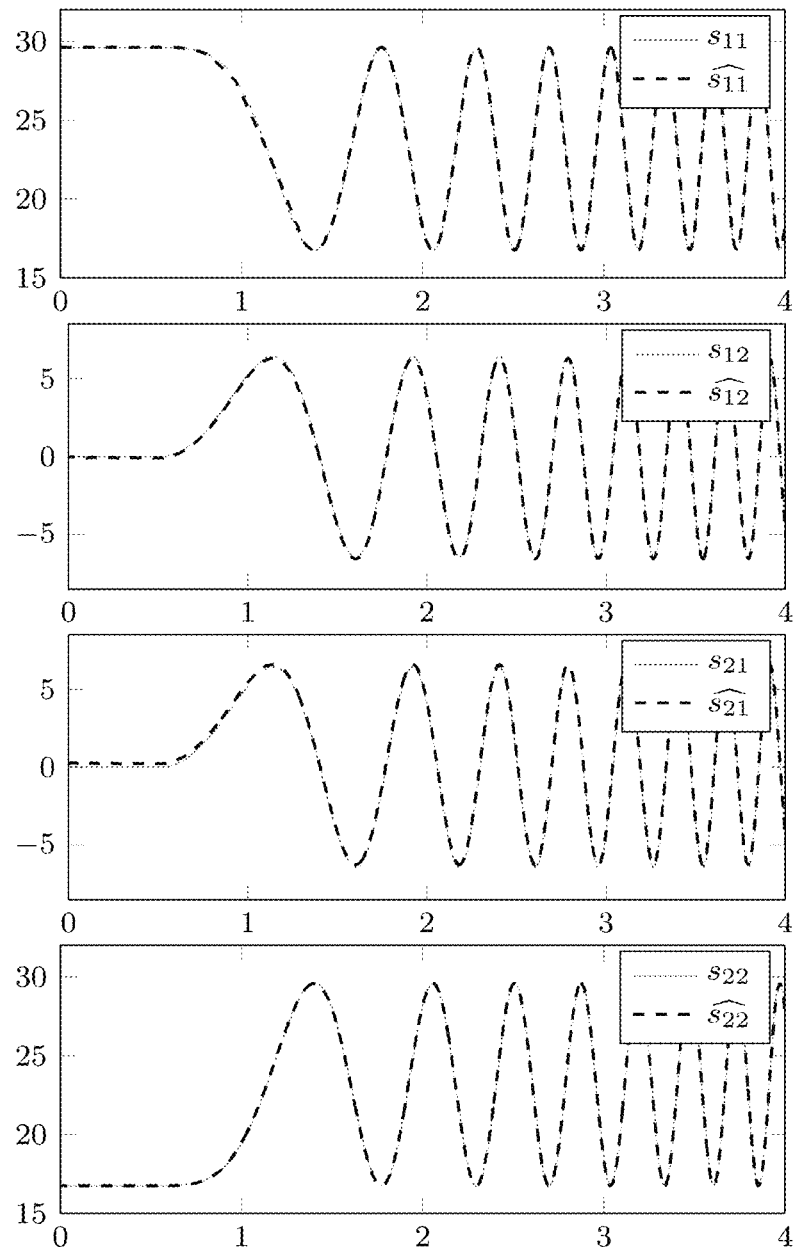
Fig. 21: Reconstruction of saliency matrix $\mathcal{S}(\theta)$ (simulation).

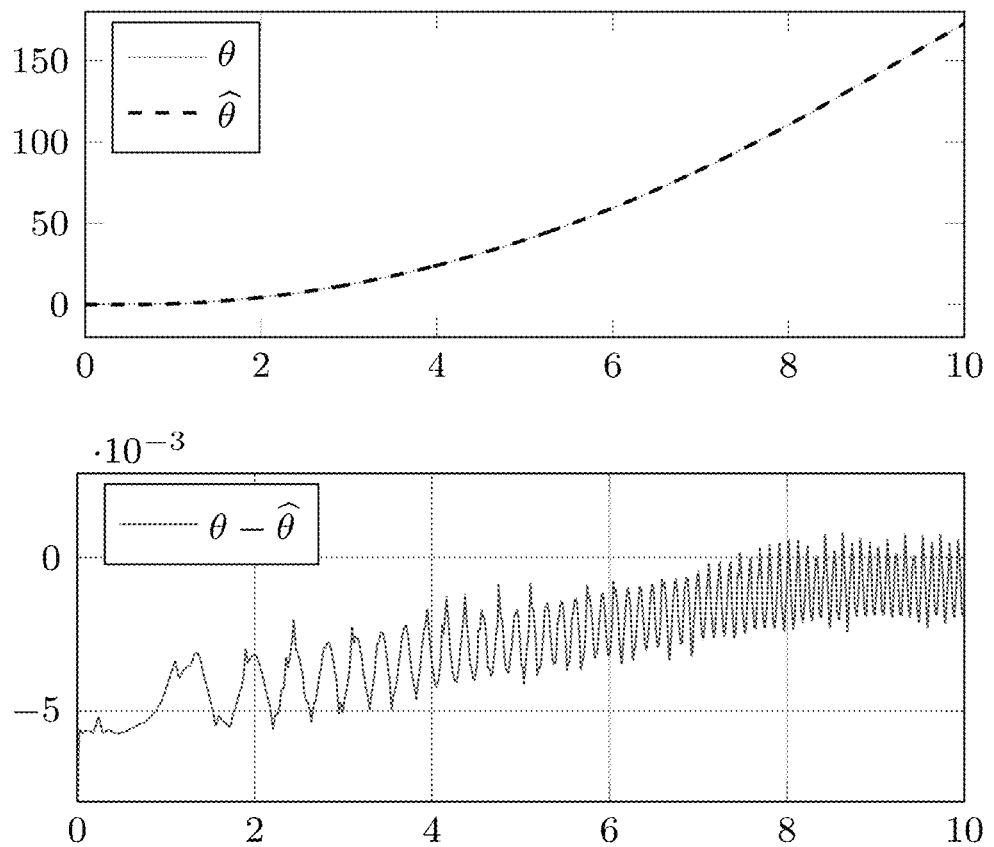
Fig. 22: Rotor position $\theta$, its estimate $\widehat{\theta}$ (top); $\theta - \widehat{\theta}$ (bottom) (shifted carriers)

VARIABLE SPEED DRIVE FOR THE SENSORLESS PWM CONTROL OF AN AC MOTOR BY EXPLOITING PWM-INDUCED ARTEFACTS

The present application claims priority to U.S. provisional utility patent application Ser. No. 62/905,663 filed on Sep. 25, 2019 and to European application serial no. 20305748.4 filed on Jul. 2, 2020, which are both incorporated herewith in their entirety.

TECHNICAL FIELD

This disclosure generally pertains to the field of motor control. More precisely, it relates to Variable Speed Drives (VSDs), which are used to control the operation of Alternating Current (AC) electric motors. The focus is on VSDs that rely on Pulse-Width Modulation (PWM) to have continuous control over the speed of the controlled AC motor.

VSDs are typically used as industrial drives in factories, installations, HVAC systems and the like to control e.g. the position, speed and/or torque of an electric motor that is dedicated to a particular task, such as e.g. the operation of a fan or the hoisting of a load.

BACKGROUND ART

In order to perform a closed-loop control of an AC motor, a VSD needs to have real-time information on the operating status of the AC motor. This information might for example be the instantaneous angular position and/or angular velocity of the motor's rotor.

The VSD may obtain this information from dedicated sensors, which are arranged on the motor and monitor the motor's operating status. However, fitting an electric motor with such sensors adds to the complexity and size of the whole drive assembly. The required sensors and sensor cabling also increase the price and reduce the reliability.

This is why so-called "sensorless" VSDs have become more and more common. In these sensorless VSDs, the motor's operating status is estimated on the basis of measurements of the motor's drive current. No additional external sensors are used. In order to improve the estimations, in particular when the motor operates at low velocity, it is a standard procedure to inject an external high-frequency probing signal into the motor's drive voltage.

The article "*Adding virtual measurements by signal injection*" by Pascal Combes et al., published in 2016 in the proceedings of the 2016 American Control Conference on pages 999 ff., conceptualizes and generalizes the signal injection technique for the sensorless control of electric motors at low speed.

Signal injection is an effective method, but it comes at a price: the ripple it creates may in practice yield unpleasant acoustic noise and excite unmodeled dynamics. In particular, in the very common situation where the electric motor is fed by a PWM inverter, the frequency of the injected probing signal may not be as high as desired so as not to interfere with the PWM (typically, it cannot exceed 500 Hz in an industrial drive with a 4 kHz-PWM frequency).

The article "*A novel approach for sensorless control of PM machines down to zero speed without signal injection or special PWM technique*" by C. Wang et al., IEEE Transactions on Power Electronics, Vol. 19, No. 6, November 2004, pages 1601 ff., proposes to measure the phase current ripples induced by conventional PWM to derive the rotor position and speed of a PWM-controlled electric motor. However, this approach is based on the measurement of current derivatives, which requires specialized current sensors and is sensitive to noise.

SUMMARY

In view of the above, it is an object of the present disclosure to provide a PWM-based variable speed drive with an improved sensorless AC motor control without signal injection.

According to the present disclosure, this object is achieved with a variable speed drive for the closed loop control of the operation of an AC electric motor based on a given control law, the variable speed drive comprising:
- an output terminal for delivering a controlled alternating drive voltage to the controlled AC electric motor;
- a solid-state power inverter for generating the drive voltage;
- a drive controller for controlling the generation of the drive voltage by the power inverter; and
- a drive current sensing device for measuring the instantaneous intensity of the drive current taken up by the controlled AC electric motor, and for providing the resulting measurements as a drive current intensity signal to the drive controller, wherein the drive controller includes:
- a pulse-width modulation generator;
- a control law module storing the given control law; and
- a state variable estimation module for estimating the instantaneous value of at least one state variable of the controlled AC electric motor, wherein the control law module is adapted to, based on the stored control law and state variable estimates provided by the estimation module, compute a target voltage signal and output the computed target voltage signal to the pulse-width modulation generator, wherein the pulse-width modulation generator is adapted to:
- approximate the received target voltage signal with a pulse-width modulated inverter control signal;
- control the operation of the power inverter using the inverter control signal, thereby obtaining the drive voltage;
- compute, based on the deviation between the inverter control signal and the target voltage signal, a state variable estimation support signal; and
- output the computed state variable estimation support signal to the state variable estimation module, and wherein the state variable estimation module is adapted to:
- estimate the instantaneous value of a state variable of the AC electric motor based on the received state variable estimation support signal and the drive current intensity signal provided by the drive current sensing device; and
- output the resulting state variable estimate to the control law module.

By modifying the PWM generator so that it computes an estimation support signal based on the PWM, and by providing this estimation support signal to the state variable estimator, the state variable estimator has supplementary information, which it can use to improve its state variable estimations.

Optionally, the variable speed drive according to the present disclosure can have the following features, separately or in combination one with the others:
- the pulse-width modulation generator is adapted to compute the state variable estimation support signal based on a pulse-width modulation inherent disturbance signal, which is obtained by subtracting the target voltage signal from the inverter control signal;

the pulse-width modulation generator is adapted to compute the state variable estimation support signal by integrating the disturbance signal to obtain the primitive of the disturbance signal;

the variable speed drive is adapted to rely on a single feedback to perform closed loop control of the AC electric motor, namely the drive current intensity signal provided by the drive current sensing device;

the variable speed drive is adapted to control the operation of the AC electric motor without the injection of a dedicated probing signal into the drive voltage;

the drive controller further includes an analog-to-digital converter for converting the drive current intensity signal into a digital signal prior to its input into the state variable estimation module;

the state variable estimation module is adapted to estimate the instantaneous value of the rotor position of the electric motor based on the received state variable estimation support signal and the drive current intensity signal provided by the drive current sensing device;

the pulse-width modulation generator is adapted to apply three-phase pulse-width modulation with single carrier to generate the inverter control signal;

the pulse-width modulation generator is adapted to apply three-phase pulse-width modulation with interleaved carriers to generate the inverter control signal.

According to a further aspect, the present disclosure also relates to an electric drive assembly comprising a synchronous reluctance motor or a permanent-magnet synchronous motor and a variable speed drive as defined above for controlling the motor.

According to yet a further aspect, the present disclosure also relates to a method of controlling, in a closed loop, the operation of an AC electric motor based on a given control law, the method comprising the following steps:

a) measuring the instantaneous intensity of the drive current taken up by the controlled AC electric motor;

b) estimating the instantaneous value of a state variable of the AC electric motor using the measured drive current intensity;

c) computing, based on the given control law and the estimated state variable, a target voltage signal;

d) approximating the computed target voltage signal with a pulse-width modulated inverting control signal;

e) computing, based on the deviation between the inverting control signal and the target voltage signal, a state variable estimation support signal;

f) generating, by voltage inversion, a controlled alternating drive voltage using the inverting control signal; and g) delivering the generated drive voltage to the controlled AC electric motor;

wherein the state variable estimation according to step b) relies on the state variable estimation support signal computed in step e) as an additional input together with the drive current intensity measured in step a).

BRIEF DESCRIPTION OF DRAWINGS

Other features, details and advantages will be shown in the following detailed description and in the figures, in which.

DESCRIPTION OF EMBODIMENTS

Figure 1:
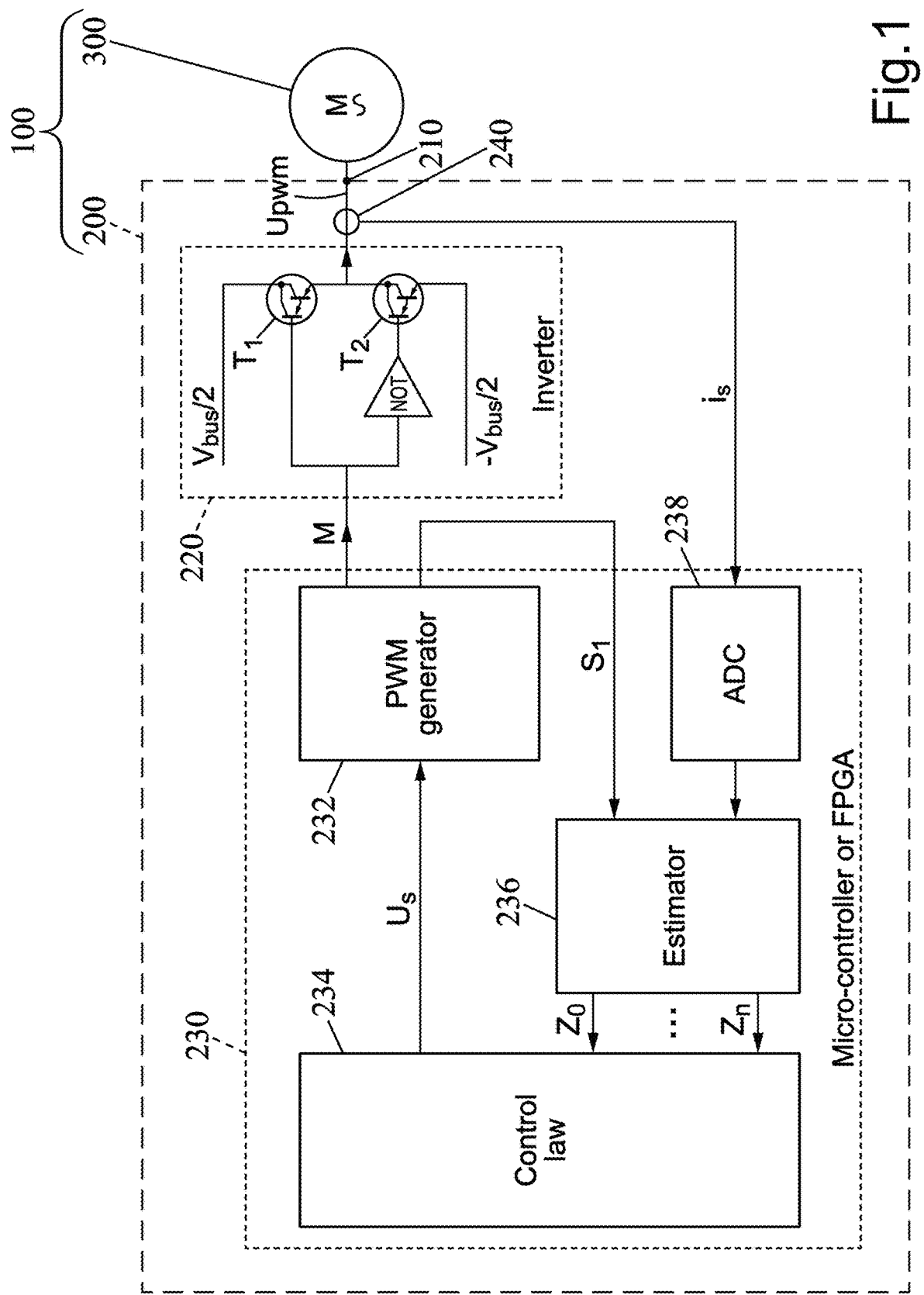
FIG. 1 is a block diagram of an electric drive assembly of the present disclosure, with a variable speed drive and an AC electric motor.

I. Exemplary Setup of a Variable Speed Drive According to the Present Disclosure FIG. 1 is a schematic diagram of an electric drive assembly 100 according to the present disclosure. The electric drive assembly 100 comprises a variable speed drive, or VSD, 200 and an AC electric motor 300.

The electric drive assembly 100 may be used in diverse industrial settings. For example, it may drive a fan of a heating, ventilation and air conditioning (HVAC) system. As another example, it may also be used to drive a water pump of a sewage installation. Many other industrial applications can be envisaged by the skilled person.

Preferably, the AC electric motor 300 is a synchronous motor, such as a permanent magnet synchronous motor, or PMSM, or a synchronous reluctance motor, or SynRM.

The purpose of the variable speed drive 200 is to control the proper operation of the electric motor 300. Thanks to the variable speed drive 200, the motor 300 can be operated at the right speed at the right time, depending on the application. The variable speed drive 200 may also allow to control the torque output of the electric motor 300 to its load.

The variable speed drive 200 controls the electric motor 300 in a closed loop. This means that the variable speed drive 200 constantly receives feedback on the instantaneous status of the motor 300 during the control of the motor. The variable speed drive 200 adjusts its control of the electric motor 300 based on a given control law. The specifics of the control law depend on the type of application of the electric motor 300.

With reference to FIG. 1, the variable speed drive 200 comprises an output terminal 210, a solid-state power inverter 220, a drive controller 230, and a drive current sensing device or current sensor 240.

The variable speed drive 200 is electrically connected to the electric motor 300 via its output terminal 210. The power output 210 delivers a controlled alternating drive voltage $u_{pwm}$ to the AC electric motor 300. The drive voltage $u_{pwm}$ is a modulated signal whose amplitude is determined by the DC voltage Vbus applied to the power inverter 220. The modulation frequency of the drive voltage $u_{pwm}$ depends on the switching frequency of the power inverter 220. The modulated drive voltage $u_{pwm}$ emulates an ideal sinusoidal drive voltage whose amplitude and frequency determine the operation of the electric motor 300.

The power inverter 220 generates the drive voltage $u_{pwm}$ by chopping up a DC voltage with the help of solid-state switches T1, T2.

The skilled person will note that the diagram of FIG. 1 shows a single phase control. This is only for simplification. Typically, the electric motor 300 will be a three-phase motor. In this case, the power inverter 220 generates a drive voltage for each of the three phases of the motor.

The current sensor 240 of the VSD 200 measures the instantaneous intensity of the drive current taken up by the electric motor 300. The current sensor 240 provides its measurements as a drive current intensity signal $i_s$ to the drive controller 230.

According to the present disclosure, the motor control by the VSD 200 is a so-called "sensorless" control. This means that the control feedback entirely relies on the current measurements provided by the current sensor 240. There are no external sensors mounted on the motor 300, such as shaft encoders and the like, to provide feedback to the VSD 200 on the motor status.

The drive controller 230 controls the generation of the drive voltage $u_{pwm}$ by the power inverter 220. This is done on the basis of an inverter control signal M provided by the drive controller 230 to the power inverter 220.

The drive controller 230 may be implemented as a microcontroller or a field programmable gate array (FPGA).

According to the present disclosure, the drive controller 230 includes a pulse-width modulation, or PWM, generator 232, a control law module 234 storing the given control law, a state variable estimation module 236, and an analog to digital converter, or ADC, 238.

The control law module 234 is adapted to, based on the stored control law and state variable estimates $z_0$ to $z_n$ provided by the estimation module 236, compute a target voltage signal $u_s$ and output the computed target voltage signal $u_s$ to the PWM generator 232.

The target voltage signal $u_s$ represents the analog voltages that must be applied to the stator windings of the electric motor 300 to obtain the desired speed or torque from the motor 300.

Since the variable speed drive 200 relies on pulse-width modulation, the target voltage signal $u_s$ is not directly applied to the electric motor 300. Rather, it is fed to the PWM generator 232 to be approximated by the pulse-width modulated inverter control signal M, which in turn is used to control the power inverter 220.

The pulse-width modulation generator 232 may apply three-phase pulse-width modulation with single carrier to generate the inverter control signal M (i.e. the approximation of the target voltage signal $u_s$).

Alternatively, the PWM generator may also apply three-phase pulse-width modulation with interleaved carriers to generate the inverter control signal M.

The PWM generator 232 may of course also use other PWM schemes to generate the inverter control signal M.

According to the present disclosure, the PWM generator 232 has the particularity that it computes, based on the deviation between the inverter control signal M and the target voltage signal $u_s$, a state variable estimation support signal $s_1$, and outputs the computed state variable estimation support signal $s_1$ to the state variable estimation module 236.

The state variable estimation module or estimator 236 estimates the instantaneous value of one or more state variables of the AC electric motor 300 based on the drive current intensity signal $i_s$ provided by the drive current sensor 240.

Figure 2:
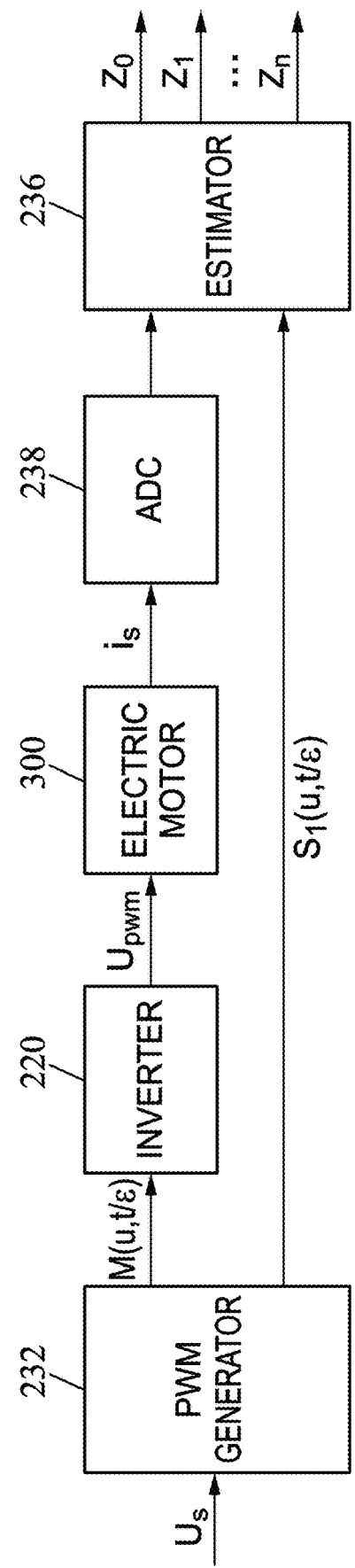
FIG. 2 is a block diagram illustrating the signal flow and processing in the electric drive assembly of FIG. 1, and FIGS. 3 through 22 illustrate example graphs.

As shown in FIGS. 1 and 2, the estimator 236 may estimate several state variables $z_0$ to $z_n$. These state variables may e.g. correspond to the rotor position of the electric motor, the angular velocity of the motor's rotor, etc.

According to the present disclosure, the estimator 236 also uses the estimation support signal $s_1$ to estimate the value of at least one of the state variables $z_0$ to $z_n$.

The estimator 236 provides the state variable estimates $z_0$ to $z_n$ to the control law module 234. The control law module 234 uses these estimates in the stored control law in order to determine the target voltage signal $u_s$.

As shown in the figures, the drive controller 230 may also include an analog to digital converter 238. The purpose of the ADC 238 is to convert the analog current signal $i_s$ provided by the current sensor 240 into a digital signal that can be processed by the estimator 236.

FIG. 2 shows the signal flow between the different components of the electric drive assembly 100 of FIG. 1. The PWM generator 232 receives the target voltage signal $u_s$ from the control law module 234. Using pulse-width modulation, it approximates the target voltage signal $u_s$ by an inverter control signal M (u, t/ε). The inverter control signal M is fed to the power inverter 220. Based on this control signal M, the inverter 220 delivers a drive voltage $u_{pwm}$ to the electric motor 300. With the current sensor 240, the currents in the motor's stator windings are measured and digitized in the ADC 238. The digitized current signal is then fed to the estimator 236. The estimator 236 also receives the estimation support signal $s_1$ (u, t/ε) from the PWM generator 232. The estimator 236 provides estimates of different motor state variables $z_0$ to $z_n$ based on the received inputs.

An important aspect of the present disclosure is the enhanced PWM generator 232, which not only generates the inverter control signal M, but also the state variable estimation support signal $s_1$. With the help of the estimation support signal $s_1$, the estimation module 236 can extract supplementary information from the current signal $i_s$ to improve the state variable estimations.

The PWM generator 232 computes the state variable estimation support signal $s_1$ based on a pulse-width modulation inherent disturbance signal $s_0$. In fact, the present disclosure relies on the insight that the inverter control signal M generated by the PWM generator 232 can be modelled as a superposition of the target voltage signal $u_s$ and a disturbance signal $s_0$. Indeed, the inverter control signal M is a series of rectangular voltage pulses of varying widths, which on average, corresponds to the desired target voltage signal $u_s$. In other words, the inverter control signal M can be regarded as the desired target voltage signal $u_s$ with an added voltage "ripple". This ripple or PWM disturbance in the voltage creates a disturbance in the stator flux of the motor 300, which in turn creates a disturbance in the measured current $i_s$.

The present disclosure takes advantage of this unintended side-effect of the pulse width modulation. The ripple/artefact induced by the pulse-width modulation in the measured currents is used in the state variable estimation. This improves the estimates and thus the control of the electric motor 300.

A measure of the pulse-width modulation disturbance signal $s_0$ (i.e. the ripple) can be obtained by subtracting the target voltage signal $u_s$ from the inverter control signal M. The difference between the target voltage signal us and the inverter control signal M can then be integrated to obtain the primitive $s_1$ of the disturbance signal $s_0$.

These calculations, namely the subtraction and the integration, are done by the PWM generator 232. As shown in the figures, the PWM generator 232 provides the result $s_1$ to the estimator 236.

It can be mathematically shown (see the remainder of the present disclosure) that the primitive $s_1$ is a useful input for the estimator 236 to determine the instantaneous value of a state variable of the electric motor 300, such as the rotor position θ.

The variable speed drive of the present disclosure is particularly useful for the control of synchronous electric motors at low speeds. By suitably using the excitation provided by the pulse-width modulation itself, the variable speed drive of the present disclosure has the same benefits as a conventional variable speed drive relying on an external excitation signal, without the drawbacks of increased acoustic noise and potential interference with the pulse width modulation.

In the variable speed drive of the present disclosure, standard pulse-width modulation does not need to be modified.

Also, the estimates by the estimation module 236 only require current measurements from standard current sensors. There is no need for current measurements at extremely precise instants, which is prone to measurement errors and very impractical in an industrial drive.

Furthermore, the variable speed drive of the present disclosure also does not require specialized sensors capable of measuring current derivatives, as in other known solutions.

The teachings of the present disclosure may also be applied to the control of other types of actuators. For example, one may think of controlling the operation of an electromagnet in a magnetic bearing, or of a solenoid valve of a hydraulic or pneumatic cylinder.

II. Mathematical Derivation of Exemplary Estimators for Sensorless Electric Motor Control Consider the control system modeled by the evolution equation $$\dot{z} = f(z) + g(z)u$$

$$y_\alpha = h(z) \quad (1)$$

where z is the internal state vector of the system, u is the control input vector, and $y_\alpha$ is the measurement vector. In several practical applications (in particular electromechanical devices fed by PWM inverter), the control input is not applied directly, but through a fast-periodic modulation which yields u only in the mean. The actual system is therefore $$\dot{x} = f(x) + g(x)\mathcal{M}(u, t/\epsilon)$$

$$y = h(x)$$

where x is the state vector of the system disturbed by the modulator and y the corresponding measurement. $\epsilon > 0$ is a known small number, and $\mathcal{M}$ is 1-periodic and has mean u with respect to its second argument, i.e., $\mathcal{M}(v, \sigma) = \mathcal{M}(v, \sigma+1)$ and $\int_0^1 \mathcal{M}(v, \sigma)d\sigma = v$. The system can clearly be written as $$\dot{x} = f(x) + g(x)(u + s_0(u, t/\epsilon))$$

$$y = h(x)$$

where $s_0$ defined by $s_0(v, \sigma) := \mathcal{M}(v,\sigma) - v$ is 1-periodic and has zero mean with respect to its second argument, i.e., $s_0(v, \sigma) = s_0(v, \sigma+1)$ and $\int_0^1 s_0(v, \sigma)d\sigma = 0$. In other words, we consider a generalized kind of signal injection, where the probing signal $s_0$ is generated by the modulation process itself; notice $s_0$ depends on u, which causes several difficulties.

Thanks to a mathematical analysis based on the cherry of second-order averaging, it can be shown that the measured signal y may be written as $$y(t) = y_\alpha(t) + \epsilon y_v(t)s_1(u(t), t/\epsilon) + O(\epsilon^2)$$

where defined by $s_1$, defined by $s_1(v, \sigma) := \int_0^\sigma s_0(v, s)ds - \int_0^1 \int_0^\sigma s_0(v, s)ds\, d\sigma$, is the zero-mean primitive of $s_0$ with u considered as a parameter; the "actual measurement" $y_\alpha$ and the "virtual measurement" $y_v \overline{s_1 s_1^T}$ can be interpreted as outputs of the "ideal" system without modulation (1), namely $$y_\alpha = h(z) \quad (2)$$

$$y_v \overline{s_1 s_1^T}(u) = h'(z)g(z)\overline{s_1 s_1^T}(u) \quad (3)$$

Notice the square matrix $\overline{s_1 s_1^T}(u) = \int_0^1 (s_1 s_1^T)(u, \sigma)d\sigma$ is in general invertible (see "Multiphase PWM" hereafter), so that we simply have $y_v = h'(z)g(z)$.

The overall purpose of the invention is to extract from the measured signal y estimates of $y_\alpha$ and $y_v$ which can be used to control the system. All is then as if one would want to control the "ideal" system without modulation (1) with a feedback law relying not only on the "actual measurement" (2), but also on the "virtual measurement" (3). The problem is then simpler thanks to the supplementary information (3); in particular in the case of sensorless control electric motors at low velocity, this supplementary information gives access to the rotor position, hence is instrumental in the design of the control law.

The invention consists mainly of two parts:
1) an enhanced modulator, generating not only the modulating signal $\mathcal{M}$, but also the zero-mean primitive $s_1$ of $s_0$
2) estimators $\widehat{y_a}$ and $\widehat{y_v}$ extracting not only $y_\alpha$, but also $y_v$ from the measured signal y, using the knowledge of s1.

A possible implementation for the estimators is $$\widehat{y_a}(t) = \frac{3}{2\epsilon}\int_{t-\epsilon}^t y(\tau)d\tau - \frac{1}{2\epsilon}\int_{t-2\epsilon}^{t-\epsilon} y(\tau)dt$$

$$\widehat{y_v}(t)\overline{s_1 s_1^T}(u(t)) = \frac{1}{\epsilon^2}\int_{t-\epsilon}^t (y(\tau) - \widehat{y_a}(\tau))s_1(u(\tau), \tau/\epsilon)d\tau$$

related to the desired signals by $$\widehat{y_a}(t) = y_\alpha(t) + O(\epsilon^2)$$

$$\widehat{y_v}(t)\overline{s_1 s_1^T}(u(t)) = y_v(t)\overline{s_1 s_1^T}(u(t)) + O(\epsilon).$$

Notice these estimators are periodic low-pass filters with FIR (Finite Impulse response) many variants relying on different periodic low-pass FIR filters are possible.

III. Pulse-Width Modulation (PWM)

Generating analog physical power signals is extremely impractical, since a lot of power must be dissipated in the amplifier. Pulse Width Modulation (PWM) addresses the issue by using the transistors in saturation mode. Indeed, transistors are more efficient when they are used in saturation than when they are used in their linear range. The desired value is realized in average by adjusting the width of the pulses (hence the name of the technique).

The simplest way to realize a PWM modulator is to compare the analog signal u with a triangular carrier c oscillating between $-u_{max}$ and $u_{max}$ follows:

$$u_{PWM}(t) = \begin{cases} -u_{max} & \text{if } c(t) > u(t) \\ u_{max} & \text{if } c(t) < u(t) \end{cases} = u_{max} \, \text{sign}(u(t) - c(t))$$

where $$c(t) = \begin{cases} 4u_{max}\left(\frac{t}{T} - k + \frac{1}{4}\right) & \text{if } \frac{t}{T} \in \left[k - \frac{1}{2}, k\right] \\ -4u_{max}\left(\frac{t}{T} - k - \frac{1}{4}\right) & \text{if } \frac{t}{T} \in \left[k, k + \frac{1}{2}\right] \end{cases}$$

This is the natural sampling PWM demonstrated in FIG. 10 where the carrier is shown as continuous line c, the analog signal is shown as dashed line u and the PWM signal is shown as dotted line Upwm.

One of the disadvantages of the natural sampling PWM is that the pulses are not symmetrical. To address this issue, we can first sample the analog signal to obtain u[k]=u(kT) and then apply the PWM modulation on the sampled signal. With this PWM scheme we can check that $$\frac{1}{T}\int_{(k-\frac{1}{2})T}^{(k+\frac{1}{2})T} u_{PWM}(t)dt = \frac{1}{T}\left(\int_{(k-\frac{1}{2})T}^{(\frac{u[k]}{4u_{max}}+k-\frac{1}{4})T} u_{max}dt - \right.$$

$$\int_{(\frac{u[k]}{4u_{max}}+k-\frac{1}{4})T}^{(-\frac{u[k]}{4u_{max}}+k+\frac{1}{4})T} u_{max}dt +$$

$$\left.\int_{(-\frac{u[k]}{4u_{max}}+k+\frac{1}{4})T}^{(k+\frac{1}{2})T} u_{max}dt\right)$$

$$= \frac{u_{max}}{T}\left(\frac{u[k]}{4u_{max}} + \frac{1}{4} + 2\frac{u[k]}{4u_{max}} - \frac{1}{2} + \frac{u[k]}{4u_{max}} + \frac{1}{4}\right)$$

$$= u[k]$$

The expression of $u_{PWM}$ can be rewritten under the form $u_{PWM}=u+\tilde{u}$ with $$\tilde{u}\left(\frac{t}{T}, u\right) = u_{max} \text{ sign}\left(u - c\left(\frac{t}{T}\right)\right) - u,$$

which is a zero-mean fast-varying periodic signal with a dependence on the control.

IV. Poly-Phase PWM

When controlling poly-phase electrical devices, n>1 analog references must be modulated.

In this case the $s_1$ will be a vector with n lines and $\overline{s_1 s_1^T}$ is a n×n matrix.

Traditionally, to facilitate implementation, the n modulators use the same carrier. In this case, when two of the references are equal, this control scheme leads to two equal components in $s_1$, which means that $\overline{s_1 s_1^T}$, will not be invertible, which means that we do not obtain all the information in h'(z)g(z). Besides, when two components are close from one another $\overline{s_1 s_1^T}$ will be poorly conditioned, which complexities the signal processing.

To get more information and improve the conditioning of $\overline{s_1 s_1^T}$, we can use a different carrier for each reference. In this case, the components of $s_1$ are always independent. Consequently, the matrix $\overline{s_1 s_1^T}$, is always invertible and well-conditioned.

V. Application to Sensorless Control of an Unsaturated Synchronous Reluctance Motor (SynRM)

Using Clarke transformation Matrices $$C := \frac{2}{3}\begin{pmatrix} 1 & -1/2 & -1/2 \\ 0 & \sqrt{3}/2 & -\sqrt{3}/2 \end{pmatrix}, C^{-1} = \begin{pmatrix} 1 & 0 \\ -1/2 & \sqrt{3}/2 \\ -1/2 & -\sqrt{3}/2 \end{pmatrix}$$

and the rotation $$\mathcal{R}(\theta) := \begin{pmatrix} \cos\theta & -\sin\theta \\ \sin\theta & \cos\theta \end{pmatrix}$$

the model of the Synchronous Reluctant Motor (SynRM) is given by $$\frac{d\phi_{SDQ}}{dt} = \mathcal{R}(-\theta)Cu_{Sabc} - R_s L^{-1}\phi_{SDQ} - J\omega\phi_{SDQ}$$

$$\frac{d\theta}{dt} = \omega$$

$$\iota_{Sabc} = C^{-1}\mathcal{R}(\theta)L^{-1}\phi_{SDQ}$$

The state of this system is $\phi_{SDQ}$, the vector of the stator flux in field-oriented DQ frame, and $\theta$, the angular position of the rotor. The vector of stator voltages in physical abc frame, $u_{Sabc}$ is the control input, while $\omega$, the rotor speed, is a disturbance input, which must be obtained to achieve a proper control of the SynRM. When "sensorless" control is used the sole available measurement is the vector of stator currents in physical abc frame, $\iota_{Sabc}$. The parameters of the model are the stator resistance $R_s$ and the matrix of inductances $$L = \begin{pmatrix} L_D & 0 \\ 0 & L_Q \end{pmatrix}.$$

Since PWM is used, the voltage can be written $u_{Sabc}(t) = \overline{u}_{Sabc}(t) + \tilde{u}_{Sabc}(t/\epsilon, \overline{u}_{Sabc}(t))$.

Rewriting the system in the time scale $\sigma := t/\epsilon$, we obtain $$\frac{d\phi_{SDQ}}{d\sigma} = \epsilon(\mathcal{R}(-\theta)C\overline{u}_{Sabc} + \mathcal{R}(-\theta)C\tilde{u}_{Sabc}(\sigma, \overline{u}_{Sabc}) - R_s L^{-1}\phi_{SDQ} - J\omega\phi_{SDQ})$$

$$\frac{d\theta}{d\sigma} = \epsilon\omega$$

$$\iota_{Sabc} = C^{-1}\mathcal{R}(\theta)L^{-1}\phi_{SDQ}$$

Which is like the standard form of averaging. Applying the averaging procedure, we can show that the PWM disturbance in the voltages creates a disturbance in the stator flux, which becomes $\phi_{SDQ} = \overline{\phi}_{SDQ} + \epsilon \mathcal{R}(-\theta) C \tilde{U}_{Sabc}(t/\epsilon, \overline{u}_{Sabc})$, where $\tilde{U}_{Sabc}$ is the primitive of $\tilde{u}_{Sabc}$, with zero-mean over a PWM method. The flux disturbance in turn creates a disturbance in the measured currents which becomes $$\iota_{Sabc} = \overline{\iota}_{Sabc} + \epsilon \underbrace{C^{-1}\mathcal{R}(\theta)L^{-1}\mathcal{R}(-\theta)C}_{s(\theta)}\tilde{U}_{Sabc}(t/\epsilon, \overline{u}_{Sabc}) + O(\epsilon^2)$$

The undisturbed variables follow the original model $$\frac{d\overline{\phi}_{SDQ}}{dt} = \mathcal{R}(-\theta)C\overline{u}_{S\alpha\beta} - R_s L^{-1}\overline{\phi}_{SDQ} - J\omega\overline{\phi}_{SDQ}$$

$$\frac{d\theta}{dt} = \omega$$

$$\overline{\iota}_{S\alpha\beta} = C^{-1}\mathcal{R}(\theta)L^{-1}\overline{\phi}_{SDQ}$$

Thanks to the proposed estimators, provided $\overline{U_{Sabc}\tilde{U}_{Sabc}^T}$ is the invertible (see "Poly-phase PWM" above), we can recover $\bar{t}_{Sabc}$ and $\mathscr{S}(\theta)$ from $t_{Sabc}$, which allow to run the or control law, which computes $\bar{u}_{S\alpha\beta}$ from $\bar{t}_{S\alpha\beta}$, and retrieve $\theta$ using $\mathscr{S}(\theta)=\mathscr{R}(\theta)L^{-1}\mathscr{R}(-\theta)$, as can be done with HF injection, but without the need of an additional disturbance.

Adding Virtual Measurements by PWM-Induced Signal Injection

Abstract: We show that for PWM-operated devices, it is possible to benefit from signal injection without an external probing signal, by suitably using the excitation provided by the PWM itself. As in the usual signal injection framework conceptualized in [1], an extra "virtual measurement" can be made available for use in a control law, but without the practical drawbacks caused by an external signal.

I. Introduction

Signal injection is a control technique which consists in adding a fast-varying probing signal to the control input. This excitation creates a small ripple in the measurements, which contains useful information if properly decoded. The idea was introduced in [2], [3] for controlling electric motors at low velocity using only measurements of currents. It was later conceptualized in [1] as a way of producing "virtual measurements" that can be used to control the system, in particular to overcome observability degeneracies. Signal injection is a effective method, see e.g. applications to electromechanical devices along these lines in [4], [5], but it comes at a price; the ripple it creates may in practice yield unpleasant acoustic noise and excite unmodeled dynamics, in particular in the very common situation when the device is fed by a Pulse Width Modulation (PWM) inverter; indeed, the frequency of the probing signal may not be as high as desired so as not to interfere with the PWM (typically, it can not exceed 500 Hz in an industrial drive with a 4 kHz-PWM frequency).

The goal of this paper is to demonstrate that for PWM-operated devices, it is possible to benefit from signal injection without an external probing signal, by using the excitation provided by the PWM itself, as e.g. in [6]. More precisely, consider the Single-Input Single-Output system $$\dot{x}=f(x)+g(x)u, \quad (1a)$$

$$y=h(x), \quad (1b)$$

where u is the control input and y the measured output. We first show in section II that when the control is impressed through PWM, the dynamics may be written as $$\dot{x} = f(x) + g(x)\left(u + s_0\left(u, \frac{t}{\varepsilon}\right)\right), \quad (2)$$

with $s_0$ 1-periodic and zero-mean in the second argument i.e. $s_0(u, \sigma+1)=s_0(u, \sigma)$ and $\int_0^1 s_0(u, \sigma)d\sigma=0$ for all u; $\varepsilon$ is the PWM period, hence assumed small. The difference with usual signal injection is that the probing signal $s_0$ generated by the modulation process now depends not only on time, but also on the control input u. This makes the situation more complicated, in particular because $s_0$ can be discontinuous in both its arguments. Nevertheless, we show in section III that the second-order averaging analysis of [1] can be extended to this case. In the same way, we show in section IV that the demodulation procedure of [1] can be adapted to make available the so-called virtual measurement $$y_0:=H_1(x):=\varepsilon h'(x)g(x),$$

in addition to the actual measurement $y_0:=H_0(x):=h(x)$. This extra signal is likely to simplify the design of a control law, as illustrated on a numerical example in section V.

Finally, we list some definitions used throughout the paper, S denotes a function of two variables, which is T-periodic in the second argument, i.e. $S(v, \sigma+T)=S(v, \sigma)$ for all v:

the mean of S in the second argument is the function (of one variable)

$$\bar{S}(v) := \frac{1}{T}\int_0^T S(v, \sigma)d\sigma;$$

S has zero mean in the second argument if $\bar{S}$ is identically zero if S has zero mean in the second argument, its zero-mean primitive in the second argument is defined by $$S_1(v, \tau) := \int_0^\tau S(v, \sigma)d\sigma - \frac{1}{T}\int_0^T \int_0^\tau S(v, \sigma)d\sigma d\tau;$$

notice $S_1$ is T-periodic in the second argument because S has zero mean in the second argument the moving average M(k) of k is defined by $$M(k)(t) := \frac{1}{\varepsilon}\int_{t-\varepsilon}^t k(\tau)d\tau$$

$\mathcal{O}_\infty$ denotes the uniform "big O" symbol of analysis, namely $f(z, \varepsilon)=\mathcal{O}_\infty(\varepsilon^p)$ if $|f(z, \varepsilon)|\leq K\varepsilon^p$ for $\varepsilon$ small enough, with K>0 independent of z and $\varepsilon$.

II. PWM-Induced Signal Injection

When the control input u in (1a) is impressed through a PWM process with period $\varepsilon$, the resulting dynamics reads $$\dot{x} = f(x) + g(x)\mathcal{M}\left(u, \frac{t}{\varepsilon}\right), \quad (3)$$

with $\mathcal{M}$ 1-periodic and mean u in the second argument; the detailed expression for $\mathcal{M}$ is given below. Setting $s_0(u, \sigma):= \mathcal{M}(u, \sigma)-u$, (3) obviously takes the form (2), with $s_0$ 1-periodic and zero-mean in the second argument.

Classical PWM with the period $\varepsilon$ and range $[-u_m, u_m]$ is obtained by comparing the input signal u to the $\varepsilon$-periodic sawtooth carrier defined by $$c(t) := \begin{cases} u_m + 4w\left(\frac{t}{\varepsilon}\right) & \text{if } -\frac{u_m}{2} \leq w\left(\frac{t}{\varepsilon}\right) \leq 0 \\ u_m - 4w\left(\frac{t}{\varepsilon}\right) & \text{if } 0 \leq w\left(\frac{t}{\varepsilon}\right) \leq \frac{u_m}{2} \end{cases};$$

the 1-periodic function $$w(\sigma) := u_m \bmod\left(\sigma + \frac{1}{2}, 1\right) - \frac{u_m}{2}$$

wraps the normalized time $$\sigma = \frac{t}{\varepsilon} \text{ to } \left[-\frac{u_m}{2}, \frac{u_m}{2}\right].$$

If u varies slowly enough, it crosses the carrier c exactly once on each rising and filling ramp, at times $t_1^u > t_2^u$ such that $$u(t_1^u) = u_m + 4w\left(\frac{t_1^u}{\varepsilon}\right)$$

$$u(t_2^u) = u_m - 4w\left(\frac{t_2^u}{\varepsilon}\right).$$

The PWM-encoded signal is therefore given by $$u_{pwm}(t) = \begin{cases} u_m & \text{if } -\frac{u_m}{2} < w\left(\frac{t}{\varepsilon}\right) \le w\left(\frac{t_1^u}{\varepsilon}\right) \\ -u_m & \text{if } w\left(\frac{t_1^u}{\varepsilon}\right) < w\left(\frac{t}{\varepsilon}\right) \le w\left(\frac{t_2^u}{\varepsilon}\right) \\ u_m & \text{if } w\left(\frac{t_2^u}{\varepsilon}\right) < w\left(\frac{t}{\varepsilon}\right) \le \frac{u_m}{2} \end{cases}$$

FIG. 3 illustrates the signals u, c and $u_{pwm}$. The function $$M(u, \sigma) := \begin{cases} u_m & \text{if } -2u_m < 4w(\sigma) \le u - u_m \\ -u_m & \text{if } u - u_m < 4w(\sigma) \le u_m - u \\ u_m & \text{if } u_m - u < 4w(\sigma) \le 2u_m \end{cases}$$

$$= u_m + \text{sign}(u - u_m - 4w(\sigma)) + \text{sign}(u - u_m + 4w(\sigma)),$$

which is obviously 1-periodic and with mean u with respect to its second argument, therefore completely describes the PWM process since $$u_{pwm}(t) = M\left(u(t), \frac{t}{\varepsilon}\right).$$

Finally, the induced zero-mean probing signal is $$s_0(u, \sigma) := M(u, \sigma) - u$$

$$= u_m - u + \text{sign}\left(\frac{u - u_m}{4} - w(\sigma)\right) + \text{sign}\left(\frac{u - u_m}{4} - w(\sigma)\right),$$

and its zero-mean primitive in the second argument is $$s_1(u, \sigma) := \left(1 - \frac{u}{u_m}\right)w(\sigma) - \left|\frac{u - u_m}{4} - w(\sigma)\right| + \left|\frac{u - u_m}{4} - w(\sigma)\right|.$$

Remark 1: As $s_0$ is only piecewise continuous, one might expect problems to define the "solutions" of (2). But as noted above, if the input u(t) of the PWM encoder varies slowly enough, its output $$u_{pwm}(t) = M\left(u(t), \frac{t}{\varepsilon}\right)$$

will have exactly two discontinuities per PWM period. Chattering is therefore excluded, which is enough to ensure the existence and uniqueness of the solutions of (2), see [7], without the need for the more general Filipov theory [8]. Of course, we assume (without loss of generality in practice) that $f$, g and h in (1) are smooth enough.

Notice also $s_1$ is continuous and piecewise $C^1$ in both its arguments. The regularity in the second argument was to be expected as $s_1(u, \cdot)$ is a primitive of $s_0(u, \cdot)$; on the other hand, the regularity in the first argument stems from the specific form of $s_0$.

III. Averaging and PWM-Induced Injection

Section III-A outlines the overall approach and states the main Theorem 1, which is proved in the somewhat technical section III-B. As a matter of fact, the proof can be skipped without losing the main thread; suffice to say that if $s_0$ were Lipschitz in the first argument, the proof would essentially be an extension of the analysis by "standard" second-order averaging of [1], with more involved calculations

A. Main Result

Assume we have designed a suitable control law $$\bar{u} = \alpha(\bar{\eta}, \bar{Y}, t)$$

$$\dot{\bar{\eta}} = a(\bar{\eta}, \bar{Y}, t)_1$$

where $\bar{\eta} \in \mathbb{R}^q$, for the system $$\dot{\bar{x}} = f(\bar{x}) + g(\bar{x})\bar{u},$$

$$\bar{Y} = H(\bar{x}) := \begin{pmatrix} h(\bar{x}) \\ \varepsilon h'(\bar{x})g(\bar{x}) \end{pmatrix}.$$

By "suitable", we mean the resulting closed-loop system $$\dot{\bar{x}} = f(\bar{x}) + g(\bar{x})\alpha(\bar{\eta}, H(\bar{x}), t) \tag{4a}$$

$$\dot{\bar{\eta}} = a(\bar{\eta}, H(\bar{x}), t) \tag{4b}$$

has the desired exponentially stable behavior. We have changed the notations of the variables with ¯ to easily distinguish between the solutions of (4) and of (7) below. Of course, this describes an unrealistic situation:

- PWM is not taken into account
- the control law is not implementable, as it uses not only the actual output $\bar{y}_\alpha = h(\bar{x})$, but also the a priori not available virtual output $\bar{y}_\nu = \varepsilon h'(\bar{x})g(\bar{x})$.

Define now (up to $\mathcal{O}_\infty(\varepsilon^2)$) the function $$\bar{H}(x, \eta, \sigma, t) := H(x - \varepsilon g(x) s_1(\alpha(\eta, H(x), t), \sigma)) + \mathcal{O}_\infty(\varepsilon^2), \tag{5}$$

where $s_1$ is the zero mean primitive of $s_0$ in the second argument, and consider the control law $$u = \alpha\left(\eta, \overline{H}\left(x, \eta, \frac{t}{\varepsilon}, t\right), t\right) \tag{6a}$$

$$\dot{\eta} = a\left(\eta, \overline{H}\left(x, \eta, \frac{t}{\varepsilon}, t\right), t\right). \tag{6b}$$

The resulting closed-loop system, including PWM, reads $$\dot{x} = f(x) + g(x)M\left(\alpha\left(\eta, \overline{H}\left(x, \eta, \frac{t}{\varepsilon}, t\right), t\right), \frac{t}{\varepsilon}\right) \tag{7a}$$

$$\dot{\eta} = a\left(\eta, \overline{H}\left(x, \eta, \frac{t}{\varepsilon}, t\right), t\right). \tag{7b}$$

Though PWM is now taken into account the control law (6) still seems to contain unknown terms.
Nevertheless, it will turn out from the following result that it can be implemented.

Theorem 1: Let $(x(t), \eta(t))$ be the solution of (7) starting from $(x_0, \eta_0)$, and define $u(t):=\alpha(\eta(t), H(x(t)), t)$ and $y(t):=H(x(t))$; let $(\overline{x}(t), \overline{\eta}(t))$ be the solution of (4) starting from $(x_0-\varepsilon g(x_0) \cdot s_1(u(0), 0), \eta_0)$, and define $\overline{u}(t):=\alpha(\overline{\eta}(t), H(\overline{x}(t)),t)$. Then, for $t \geq 0$, $$x(t) = \overline{x}(t) + \varepsilon g(\overline{x}(t))s_1\left(\overline{u}(t), \frac{t}{\varepsilon}\right) + \mathcal{O}_\infty(\varepsilon^2) \tag{8a}$$

$$\eta(t) = \overline{\eta}(t) + \mathcal{O}_\infty(\varepsilon^2) \tag{8b}$$

$$y(t) = H_0(\overline{x}(t)) + H_1(\overline{x}(t))s_1\left(\overline{u}(t), \frac{t}{\varepsilon}\right) + \mathcal{O}_\infty(\varepsilon^2). \tag{8c}$$

The practical meaning of the theorem is the following. As the solution $(x(t), \eta(t))$ is piecewise $C^1$, we have by Taylor expansion using (8a)-(8b) that $u(t)=\overline{u}(t)+\mathcal{O}_\infty(\varepsilon^2)$. In the same way, as $s_1$ is also piecewise $C^1$, we have $$s_1\left(u(t), \frac{t}{\varepsilon}\right) = s_1\left(\overline{u}(t), \frac{t}{\varepsilon}\right) + \mathcal{O}_\infty(\varepsilon^2).$$

As a consequence, we can invert (8a)-(8b), which yields $$\overline{x}(t) = x(t) - \varepsilon g(x(t))s_1\left(u(t), \frac{t}{\varepsilon}\right) + \mathcal{O}_\infty(\varepsilon^2) \tag{9a}$$

$$\overline{\eta}(t) = \eta(t) + \mathcal{O}_\infty(\varepsilon^2). \tag{9b}$$

Using this into (5), we then get $$\overline{H}\left(x(t), \eta(t), \frac{t}{\varepsilon}, t\right) = H\left(x(t) - \varepsilon g(x(t))s_1\left(u(t), \frac{t}{\varepsilon}\right)\right) + \mathcal{O}_\infty(\varepsilon^2), \tag{10}$$

$$= H(\overline{x}(t)) + \mathcal{O}_\infty(\varepsilon^2).$$

On the other hand, we will see in section IV that, thanks to (8c), we can produce an estimate $\hat{Y}=H(\overline{x})+\mathcal{O}_\infty(\varepsilon^2)$. This means the PWM-fed dynamics (3) acted upon by the implementable feedback $$u=\alpha(\eta,\hat{Y},t)$$

$$\dot{\eta}=a(\eta,\hat{Y},t).$$

behaves exactly as the closed-loop system (4) except for the presence of a small ripple (described by (8a)-(8b)).

Remark 2: Notice that, according to Remark 1, $H_0(\overline{x}(t))$ and $H_1(\overline{x}(t))$ in (8c) may be as smooth as desired (the regularity is inherited from only f, g, h, $\alpha$, a); on the other hand $$s_1\left(u(t), \frac{t}{\varepsilon}\right)$$

is only continuous and piecewise $C^1$. Nevertheless, this is enough to justify all the Taylor expansions performed in the paper.

Proof of Theorem 1

Because of the lack of regularity of $s_0$, we must go back to the fundamentals of the second-order averaging theory presented in [9, chapter 2] (with slow time dependence [9, section 3.3]). We first introduce two ad hoc definitions.

Definition 1: A function $\varphi(X, \sigma)$ is slowly-varying in average if there exists $\lambda>0$ such that for $\varepsilon$ small enough, $$\int_\alpha^{\alpha+T} \|\varphi(p(\varepsilon\sigma)+\varepsilon^k q(\sigma),\sigma)-\varphi(p(\varepsilon\sigma),\sigma)\|d\sigma \leq \lambda T \varepsilon^k,$$

where p, q are continuous with q bounded; $\alpha$ and $T>0$ are arbitrary constants. Notice that if $\varphi$ is Lipschitz in the first variable then it is slowly-varying in average. The interest of this definition is that it is satisfied by $s_0$.

Definition 2: A function $\varphi$ is $\mathcal{O}_\infty(\varepsilon^3)$ in average if there exists $K>0$ such that $\|\int_0^\alpha \varphi(q(s), s)ds\| \leq k \varepsilon^3 \sigma$ for all $\sigma \geq 0$. Clearly, if $\phi$ is $\mathcal{O}_\infty(\varepsilon^3)$ then it is $\mathcal{O}_\infty(\varepsilon^3)$ in average.

The proof of Theorem 1 follows the same steps as [9, chapter 2], but with weaker assumptions. We first rewrite (7) in the fast timescale $\sigma:=t/\varepsilon$ as $$\frac{dX}{d\sigma} = \varepsilon F(X, \sigma, \varepsilon\sigma). \tag{11}$$

where $X := (x, \eta)$ and $$F(X, \sigma, \tau) := \begin{pmatrix} f(x) + g(x)M(\alpha(\eta, \overline{H}(x, \eta, \sigma, \tau), \tau)) \\ a(\eta, \overline{H}(x, \eta, \sigma, \tau), \tau) \end{pmatrix}.$$

Notice F is 1-periodic in the second argument. Consider also the so-called averaged system $$\frac{d\overline{X}}{d\sigma} = \varepsilon \overline{F}(\overline{X}, \varepsilon\sigma). \tag{12}$$

where $\overline{F}$ is the mean F in the second argument.

Define the near-identity transformation $$X = \tilde{X} + \varepsilon W(\tilde{X}, \sigma, \varepsilon\sigma), \tag{13}$$

where $\tilde{X} := (\tilde{x}, \tilde{\eta})$ and $$W(\tilde{X}, \sigma, \tau) := \begin{pmatrix} g(\tilde{x}) \\ 0 \end{pmatrix} s_1(\alpha(\tilde{\eta}, H(\tilde{x}, \tilde{\eta}, \sigma, \tau), \tau), \sigma).$$

Inverting (13) yields $$\tilde{X}=X-\varepsilon W(X,\sigma,\varepsilon\sigma)+\mathcal{O}_\infty(\varepsilon^2). \tag{14}$$

By lemma 1, this transformation puts (11) into $$\frac{d\tilde{X}}{d\sigma} = \varepsilon \overline{F}(\tilde{X}, \varepsilon\sigma) + \varepsilon^2 \Phi(\tilde{X}, \sigma, \varepsilon\sigma) + \phi(\tilde{X}, \sigma, \varepsilon\sigma); \quad (15)$$

$\Phi$ is periodic and zero-mean in the second argument, and slowly-varying in average, and $\phi$ is $\mathcal{O}_\infty(\varepsilon^3)$ in average.

By lemma 2, the solutions $\overline{X}(\sigma)$ and $\tilde{X}(\sigma)$ of (12) and (15), starting from the same initial conditions, satisfy $$\tilde{X}(\sigma) = \overline{X}(\sigma) + \mathcal{O}_\infty(\varepsilon^3).$$

As a consequence, the solution $X(\sigma)$ of (11) stating from $X_0$ and the solution $\overline{X}(\sigma)$ of (12) starting from $X_0 - \varepsilon W(X_0, 0, 0)$ are related by $X(\sigma) = \overline{X}(\sigma) + \varepsilon W(\overline{X}(\sigma), \sigma, \varepsilon\sigma) + \mathcal{O}_\infty(\varepsilon^2)$, which is exactly (8a)-(8b). Inserting (8a) in $y = h(x)$ and Taylor expanding yields (8c).

Remark 3: If $s_0$ were differentiable in the first variable, $\Phi$ would be Lipschitz and $\phi$ would be $\mathcal{O}$ on a in (15), hence the averaging theory of [9] would directly apply.

Remark 4. In the sequel, we prove for simplicity only the estimation $\tilde{X}(\sigma) = \overline{X}(\sigma) + \mathcal{O}(\varepsilon^2)$ on a timescale $1/\varepsilon$. The continuation to infinity follows from the exponential stability of (4), exactly as in [1, Appendix].

In the same way, lemma 2 is proved without slow-time dependence, the generalization being obvious as in [9, section 3.3].

Lemma 1: The transformation (13) puts (11) into (15), where $\Phi$ is periodic and zero-mean in the second argument, and slowly-varying in average, $\phi$ is $\mathcal{O}_\infty(\varepsilon^3)$ in average.

Proof: To determine the expression for $d\tilde{X}/d\sigma$, the objective is to compute $dX/d\sigma$ as a function of $\tilde{X}$ with two different methods. On the one hand we replace $X$ with its transformation (13) in the closed-loop system (11), and on the other hand we differentiate (13) with respect to $\sigma$.

We first compute $s_0(\alpha(\eta, \overline{H}(x, \eta, \sigma, \varepsilon\sigma), \varepsilon\sigma), \sigma)$ as a function of $\tilde{X} = (\tilde{x}, \tilde{\eta})$. Exactly as in (10), with $(\tilde{x}, \tilde{\eta})$ replacing $(\overline{x}, \overline{\eta})$, and (14) replacing (9), we have $$\overline{H}(x, \eta, \sigma, \varepsilon\sigma) = H(\tilde{x}) + \mathcal{O}_\infty(\varepsilon^2).$$

Therefore, by Taylor expansion $$\alpha(\eta, \overline{H}(x, \eta, \sigma, \varepsilon\sigma), \varepsilon\sigma) = \alpha(\tilde{\eta}, H(\tilde{x}), \varepsilon\sigma) + \varepsilon^2 K_\alpha(\tilde{X}, \sigma),$$

with $K_\alpha$ bounded. The lack of regularity of $s_0$ prevents further Taylor expansion; nonetheless, we still can write $$s_0(\alpha(\eta, \overline{H}(x, \eta, \sigma, \varepsilon\sigma), \varepsilon\sigma), \sigma) = s_0(\alpha(\tilde{\eta}, H(\tilde{x}), \varepsilon\sigma) + \varepsilon^2 K_\alpha(\tilde{X}, \sigma), \sigma).$$

Finally inserting (13) into (11) and Taylor expanding, yields after tedious but straightforward computations, $$\frac{dX}{d\sigma} = \varepsilon \overline{F}(\tilde{X}, \varepsilon\sigma) + \varepsilon G(\tilde{X}) s_0^{a,+}(\tilde{\cdot}) + \quad (16)$$
$$\varepsilon^2 \overline{F}(\tilde{X}, \varepsilon\sigma) G(X) s_1^a(\tilde{\cdot}) + \varepsilon^2 G'(\tilde{X}) G(\tilde{X}) s_1^a(\tilde{\cdot}) s_0^{a,+}(\tilde{\cdot}) + O_\infty(\varepsilon^3);$$

we have introduced the following notations $$(\tilde{\cdot}) := (\tilde{X}, \sigma, \varepsilon\sigma)$$
$$s_i^a(\tilde{\cdot}) := s_i(\alpha(\tilde{\eta}, H(\tilde{x}), \varepsilon\sigma), \sigma),$$
$$s_0^{a,+}(\tilde{\cdot}) := s_0(\alpha(\tilde{\eta}, H(\tilde{x}), \varepsilon\sigma) + \varepsilon^2 K_a(\tilde{X}, \sigma), \sigma)$$
$$\Delta s_0^a(\tilde{\cdot}) := s_0^{a,+}(\tilde{\cdot}) - s_0(\tilde{\cdot})$$

-continued $$G(X) := \begin{pmatrix} g(x) \\ 0 \end{pmatrix}$$
$$\overline{F}(X, \varepsilon\sigma) := \begin{pmatrix} f(x) + g(x)\alpha(\eta, H(x), \varepsilon\sigma) \\ \alpha(\eta, H(x), \varepsilon\sigma) \end{pmatrix}.$$

We now time-differentiate (13), which reads with the previous notations $$X = \tilde{X} + \varepsilon G(\tilde{X}) s_1^a(\tilde{\cdot}).$$

This yields $$\frac{dX}{d\sigma} = \frac{d\tilde{X}}{d\sigma} + \varepsilon G'(\tilde{X}) \frac{d\tilde{X}}{d\sigma} s_1^a(\tilde{\cdot}) + \quad (17)$$
$$\varepsilon G(\tilde{X}) \partial_1 s_1^a(\tilde{\cdot}) \frac{d\tilde{X}}{d\sigma} + \varepsilon G(\tilde{X}) s_0^a(\tilde{\cdot}) + \varepsilon^2 G(\tilde{X}) \partial_3 s_1^a(\tilde{\cdot}),$$

since $\partial_2 s_1^\alpha = s_0^\alpha$. Now assume $\tilde{X}$ satisfies $$\frac{d\tilde{X}}{d\sigma} = \varepsilon \overline{F}(\tilde{X}, \varepsilon\sigma) + \varepsilon G(\tilde{X}) \Delta s_0^a(\tilde{\cdot}) + \varepsilon^2 \Psi(\tilde{\cdot}), \quad (18)$$

where $\Psi(\tilde{\cdot})$ is yet to be computed. Inserting (18) into (17), $$\frac{dX}{d\sigma} = \varepsilon \overline{F}(\tilde{X}, \varepsilon a) + \varepsilon G(\tilde{X}) \Delta s_0^a(\tilde{\cdot}) + \varepsilon^2 \Psi(\tilde{\cdot}) + \quad (19)$$
$$\varepsilon^2 G'(\tilde{X}) \overline{F}(\tilde{X}, \varepsilon\sigma) s_1^a(\tilde{\cdot}) + \varepsilon^2 G'(\tilde{X}) G(\tilde{X}) \Delta s_0^a(\tilde{\cdot}) s_1^a(\tilde{\cdot}) +$$
$$\varepsilon^2 G(\tilde{X}) \partial_1 s_1^a(\tilde{\cdot}) \overline{F}(\tilde{X}, \varepsilon\sigma) + \varepsilon^2 G(\tilde{X}) \partial_1 s_1^a(\tilde{\cdot}) G(\tilde{X}) \Delta s_0^a(\tilde{\cdot}) +$$
$$\varepsilon G(\tilde{X}) s_0^a(\tilde{\cdot}) + \varepsilon^2 G(\tilde{X}) \partial_3 s_1^a(\tilde{\cdot}) + O_\infty(\varepsilon^3).$$

Next, equation (19) and (16), $\Psi$ satisfies $$\Psi(\tilde{\cdot}) = [\overline{F}, G](\tilde{X}, \varepsilon\sigma) s_1^a(\tilde{\cdot}) + \quad (20)$$
$$G'(\tilde{X}) G(\tilde{X}) s_0^a(\tilde{\cdot}) s_1^a(\tilde{\cdot}) - G(\tilde{X}) \partial_1 s_1^a(\tilde{\cdot}) \overline{F}(\tilde{X}, \varepsilon\sigma) -$$
$$G(\tilde{X}) \partial_3 s_1^a(\tilde{\cdot}) - G(\tilde{X}) \partial_1 s_1^a(\tilde{\cdot}) G(\tilde{X}) \Delta s_0^a(\tilde{\cdot}).$$

This gives the expressions of $\Phi$ and $\phi$ in (15), $$\Phi(\tilde{\cdot}) := [\overline{F}, G](\tilde{X}, \varepsilon\sigma) s_1^a(\tilde{\cdot}) + G'(\tilde{X}) G(\tilde{X}) s_0^a(\tilde{\cdot}) s_1^a(\tilde{\cdot}) -$$
$$G(\tilde{X}) \partial_1 s_1^a(\tilde{\cdot}) \overline{F}(\tilde{X}, \varepsilon\sigma) - G(\tilde{X}) \partial_3 s_1^a(\tilde{\cdot}),$$
$$\phi(\tilde{\cdot}) := \varepsilon^2 \Psi_1(\tilde{\cdot}) + \varepsilon G(\tilde{X}) \Delta s_0^a,$$

with $$\Psi_1(\tilde{\cdot}) := -G(\tilde{X}) \partial_1 s_1^a(\tilde{\cdot}) G(\tilde{X}) \Delta s_0^a(\tilde{\cdot}).$$

The last step is to check that $\Phi$ and $\phi$ satisfy the assumptions of the lemma. Since $s_0^\alpha$, $s_1^\alpha$, $\partial_1 s_1^\alpha$ and $\partial_2 s_1^\alpha$ are periodic and zero-mean in the second argument, and slowly-varying in average, so is $\Phi$. There remains to prove that $\phi = \mathcal{O}_\infty(\varepsilon^3)$ in average. Since $\Delta s_0^\alpha$ is slowly-varying in average, $$\int_0^\sigma \|\Delta s_0^\alpha(\tilde{\cdot})(s))\| ds \le \lambda_0 \sigma \varepsilon^2.$$

with $\lambda_0>0$, G being bounded by a constant $c_g$, this implies $$\|\int_0^\sigma \varepsilon G(\tilde{X}(s))\Delta s_0^\alpha(\cdot)(s))ds\mu\| \le c_g\lambda_0\sigma\varepsilon^3.$$

Similarly, $\partial_1 s_1$ being bounded by $c_{11}$, $\Psi_1$ satisfies $$\|\int_0^\sigma \varepsilon^2\Psi_1(\tilde{\cdot}(s))ds\| \le c_g^2 c_{11}\lambda_0\sigma\varepsilon_0\varepsilon^3.$$

Summing the two previous inequalities yields $$\|\int_0^\sigma \phi(\tilde{\cdot}(s))ds\| \le \lambda_0 c_g(1+c_{11}c_g\varepsilon_0)\sigma\varepsilon^3,$$

which concludes the proof.

Lemma 2: Let $\overline{X}(\sigma)$ and $\tilde{X}(\sigma)$ be respectively the solutions of (12) and (15) starting at 0 from the same initial conditions. Then, for all $\sigma \ge 0$ $$\tilde{X}(\sigma) = \overline{X}(\sigma) + \mathcal{O}_\infty(\varepsilon^2).$$

Proof: Let $E(\sigma) := \tilde{X}(\sigma) - \overline{X}(\sigma)$. Then, $$E(\sigma) = \int_0^\sigma \left[\frac{d\tilde{X}}{d\sigma}(s) - \frac{d\overline{X}}{d\sigma}(s)\right]ds$$

$$= \varepsilon \int_0^\sigma \left[F(\tilde{X}(s)) - F(\overline{X}(s))\right]ds + \varepsilon^2 \int_0^\sigma \Phi(\tilde{\cdot}(s))ds +$$

$$\int_0^\sigma \phi(\tilde{\cdot}(s))ds$$

As F Lipschitz with constant $\lambda_F$, $$\varepsilon\int_0^\sigma \|F(\tilde{X}(s)) - F(\overline{X}(s))\|ds \le \varepsilon\lambda_F\int_0^\sigma \|E(s)\|ds.$$

On the other hand, there exists by lemma 3 $c_1$ such that $$\varepsilon^2\|\int_0^\sigma \Phi(\tilde{\cdot}(s))ds\| \le c_1\varepsilon^2$$

Finally, as $\phi$ is $\mathcal{O}_\infty(\varepsilon^3)$ in average, there exists $c_2$ such that $$\mu\int_0^\sigma \phi(\tilde{\cdot}(s))ds\| \le c_2\varepsilon^3\sigma.$$

The summation of these estimations yields $$\|E(\sigma)\| \le \varepsilon\lambda_F\int_0^\sigma \|E(s)\|ds + c_1\varepsilon^2 + c_2\varepsilon^3\sigma.$$

Then by Gronwall's lemma [9, Lemma 1.3.3]

$$\|E(\sigma)\| \le \left(\frac{c_2}{\lambda_p} + c_1\right)e^{\lambda_F\sigma}\varepsilon^2,$$

which means $\tilde{X} = \overline{X} + \mathcal{O}_\infty(\varepsilon^2)$.

The following lemma is an extension of Besjes' lemma [9, Lemma 2.8.2] when $\varphi$ is no longer Lipschitz, but only slowly-varying in average.

Lemma 3: Assume $\varphi(X, \sigma)$ is T-periodic and zero-mean in the second argument, bounded, and slowly-varying in average. Assume the solution $X(\sigma)$ of $\dot{X} = \mathcal{O}_\infty(\varepsilon)$ is defined for $0 \le \sigma \le L/\varepsilon$. There exists $c_1 > 0$ such that $$\|\int_0^\sigma \varphi(X(s), s)ds\| \le c_1.$$

Proof: Along the lines of [9], we divide the interval [0, t] in m subintervals [0, T], ..., [(m−1)T, mT] and a remainder [mT, t]. By splitting the integral on those intervals, we write $$\int_0^\sigma \varphi(x(s), s)ds = \sum_{i=0}^m \int_{(i-1)T}^{iT} \varphi(x((i-1)T), s)ds +$$

$$\sum_{i=0}^m \int_{(i-1)T}^{iT} [\varphi(x(s), s) - \varphi(x((i-1)T), s)]ds + \int_{mT}^\sigma \varphi(x(s), s)ds,$$

where each of the integral in the first sum are zero as $\varphi$ is periodic with zero mean. Since $\varphi$ is bounded, the remainder is also bounded by a constant $c_2 > 0$. Besides $$x(s) = x((i-1)T) + \int_{(i-1)T}^i \dot{x}(\tau)d\tau$$

$$= x((i-1)T) + \varepsilon q(s),$$

with q continuous and bounded. By hypothesis, there exists $\lambda > 0$ such that $0 \le i \le m$, $$\int_{(i-1)T}^T\|\varphi(x(s), s) - \varphi(x((i-1)T), s)\|ds \le \lambda T\varepsilon$$

Therefore by summing the previous estimations, $$\|\int_0^\sigma \varphi(x(s), s)ds\| \le m\lambda T\varepsilon + o_2,$$

with $mT \le t \le L/\varepsilon$, consequently $m\lambda T\varepsilon + o_2 \le \lambda L + o_2$; which concludes the proof.

IV. Demodulation

From (8c), we can write the measured signal y as $$y(t) = y_\alpha(t) + y_v(t)s_1\left(u(t), \frac{t}{\varepsilon}\right) + O_\infty(\varepsilon^2),$$

where the signal u feeding the PWM encoder is known. The following result shows $y_\alpha$ and $y_v$ can be estimated from y, for use in a control law as described in section III-A.

Theorem 2: Consider the estimators $\hat{y}_\alpha$ and $\hat{y}_u$ defined by $$\hat{y}_a(t) := \frac{3}{2}M(y)(t) - \frac{1}{2}M(y)(t-\varepsilon)$$

$$k_\Delta(\tau) := (y(\tau) - \hat{y}_n(\tau))s_1\left(u(\tau), \frac{\tau}{\varepsilon}\right)$$

$$\hat{y}_v(t) := \frac{M(k_\Delta)(t)}{\overline{s_1^2}(u(t))},$$

where $M: y \mapsto \varepsilon^{-1}\int_0^\varepsilon y(\tau)d\tau$ is the moving average operator, and $\overline{s_1^2}$ the mean of $s_1^2$ in the second argument (cf end of section I). Then, $$\hat{y}_\alpha(t) = y_\alpha(t) + \mathcal{O}_\infty(\varepsilon^2) \quad (21a)$$

$$\hat{y}_v(t) = y_v(t) + \mathcal{O}_\infty(\varepsilon^2). \quad (21b)$$

Recall that by construction $y_v(t) = \mathcal{O}_\infty(\varepsilon)$, hence (21b) is essentially a first-order estimation; notice also that $\overline{s_1^2}(u(t))$ is always non-zero when u(t) does not exceed the range of the PWM encoder.

Proof: Taylor expanding $y_\alpha$, $y_v$, u and $s_1$ yields $$y_a(t-\tau) = y_a(t) - \tau\dot{y}_a(t) + O_\infty(\tau)^2$$

$$y_v(t-\tau) = y_v(t) + O_\infty(\varepsilon)O_\infty(\tau)$$

$$s_1(u(t-\tau), \sigma) = s_1(u(t) + O_\infty(\tau), \sigma)$$

$$= s_1(u(t), \sigma) + O_\infty(\tau);$$

in the second equation, we have used $y_v(t)=\mathcal{O}_\infty(\varepsilon)$. The moving average $y_\alpha$ then reads $$M(y_a)(t) = \frac{1}{\varepsilon}\int_0^\varepsilon y_a(t-\tau)d\tau \quad (22)$$
$$= \frac{1}{\varepsilon}\int_0^\varepsilon (y_a(t) - \tau \dot{y}_a(t) + O_\infty(\tau^2))d\tau$$
$$= y_a(t) - \frac{\varepsilon}{2}\dot{y}_a(t) + O_\infty(\varepsilon^2).$$

A similar computation for $$k_v(t) := y_v(t)s_1\left(u(t), \frac{t}{\varepsilon}\right)$$

yields $$M(k_v)(t) = \frac{1}{\varepsilon}\int_0^\varepsilon y_v(t-\tau)s_1\left(u(t-\tau), \frac{t-r}{\varepsilon}\right)d\tau \quad (23)$$
$$= y_v(t)(\overline{s_1}(u(t)) + O_\infty(\varepsilon)) + O_\infty(\varepsilon^2)$$
$$= O_\infty(\varepsilon^2),$$

since $s_1$ is 1-periodic and zero mean in the second argument. Summing (22 and 23), we eventually find $$M(y)(t) = y_a(t) - \frac{\varepsilon}{2}\dot{y}_a(t) + O_\infty(\varepsilon^2).$$

As a consequence, we get after another Taylor expansion $$\tfrac{3}{2}M(y)(t)-\tfrac{1}{2}M(y)(t-\varepsilon)=y_\alpha(t)+\mathcal{O}_\infty(\varepsilon^2),$$

which is the desired estimation (21a).
On the other hand, (21a) implies $$k_\Delta(t)=y_v(t)s_1^2(u(t),t/\varepsilon)+\mathcal{O}_\infty(\varepsilon^2).$$

Proceeding as for $M(k_v)$, we find $$M(k_\Delta)(t) = \frac{1}{\varepsilon}\int_0^\varepsilon y_v(t-\tau)s_1^2\left(u(t-\tau), \frac{t-\tau}{\varepsilon}\right)d\tau$$
$$= y_v(t)(\overline{s_1^2}(u(t)) + O_\infty(\varepsilon)) + O_\infty(\varepsilon^2)$$
$$= y_v(t)\overline{s_1^2}(u(t)) + O_\infty(\varepsilon^2).$$

Dividing by $\overline{s_1^2}(u(t))$ yields the desired estimation (21b).

V. Numerical Example

We illustrate the interest of the approach on the system $$\dot{x}_1=x_2,$$
$$\dot{x}_2=x_3,$$
$$\dot{x}_3=u+d,$$
$$y=x_2+x_1x_3,$$

where d is an unknown disturbance; u will be impressed through PWM with frequency 1 kHz (i.e. $\varepsilon=10^{-3}$) and range [−20, 20]. The objective is to control $x_1$, while rejecting the disturbance d, with a response time of a few seconds. We want to operate around equilibrium points, which are of the form $(x_1^{eq}, 0, 0; -d^{eq}, d^{eq})$, for $x_1^{eq}$ and $d^{eq}$ constant. Notice the observability degenerates at such points, which renders not trivial the design of a control law.

Nevertheless the PWM-induced signal injection makes available the virtual measurement $$y_v = \varepsilon(x_3 \quad 1 \quad x_1)\begin{pmatrix}0\\0\\1\end{pmatrix} = \varepsilon x_1,$$

from which it is easy to design a suitable control law, without even using the actual input $y_\alpha=x_2+x_1x_3$. The system being now fully linear, we use a classical controller-observer, with disturbance estimation to ensure an implicit integral effect. The observes is thus given by $$\dot{\hat{x}}_1 = \hat{x}_2 + l_1\left(\frac{y_v}{\varepsilon} - \hat{x}_1\right),$$
$$\dot{\hat{x}}_2 = \hat{x}_3 + l_2\left(\frac{y_v}{\varepsilon} - \hat{x}_1\right),$$
$$\dot{\hat{x}}_3 = u + \hat{d} + l_3\left(\frac{y_v}{\varepsilon} - \hat{x}_1\right),$$
$$\dot{\hat{d}} = l_d\left(\frac{y_v}{\varepsilon} - \hat{x}_1\right),$$

and the controller by $$u=-k_1\hat{x}_1-k_2\hat{x}_2-k_3\hat{x}_3-k_d\hat{d}+kx_1^{ref}.$$

The gains are chosen to place the observer eigenvalues (−1.19, −0.73, −0.49±0.57i) and the controller eigenvalues at (−6.59, −3.30±5.71i). The observer is slower than the controller in accordance with dual Loop Transfer Recovery, thus ensuring a reasonable robustness. Setting $\eta:=(\hat{x}_1, \hat{x}_2, \hat{x}_3, \hat{d})^T$, this controller-observer obviously reads $$u=-K\eta+kx_1^{ref} \quad (24a)$$
$$\dot{\eta}=M\eta+Nx_1^{ref}(t)+Ly_v \quad (24b)$$

Finally, this ideal control law is implemented as $$u_{pwm}(t) = M\left(-K\eta + kx_1^{ref}, \frac{t}{\varepsilon}\right) \quad (25a)$$
$$\dot{\eta} = M\eta + Nx_1^{ref} + L\frac{\hat{y}_v}{\varepsilon}, \quad (25b)$$

where M is the PWM function described in section II, and $\hat{y}_{84}$ obtained by the demodulation process of section IV.

The test scenario is the following: at t=0, the system start at rest at the origin; from t=2, a disturbance d=−0.25 is applied to the system; at t=14, a filtered unit step is applied to the reference $x_1^{ref}$. In FIG. 5 the ideal control law (24), i.e. without PWM and assuming $y_v$ known, is compared to the true control law (25): the behavior of (25) is excellent, it is nearly impossible to distinguish the two situations on the responses of $x_1$ and $x_2$ as by (8a) the corresponding ripple is only $\mathcal{O}_\infty(\varepsilon^2)$; the ripple is visible on $x_3$, where it is $\mathcal{O}_\infty(\varepsilon)$. The corresponding control signals u and $u_{pwm}$ are displayed in FIG. 6, and the corresponding measured outputs in FIG. 7.

To investigate the sensitivity to measurement noise, the same test was carried out with band-limited white noise (power density $1\times10^{-9}$, sample time $1\times10^{-5}$) added to y.

Even though the ripple in the measured output is buried in noise, see FIG. 8, the virtual output is comedy demodulated and the control law (25) still behaves very well.

CONCLUSION

We have presented a method to take advantage of the benefits of signal injection in PWM-fed systems without the need for an external probing signal. For simplicity, have restricted to Single-Input Single-Output systems, but then are no essential difficulties to consider Multiple-Input Multiple-Output systems. Besides, though we have focused on classical PWM, the approach can readily be extended to arbitrary modulation processes, for instance multilevel PWM; in fact, the only requirements is that $s_0$ and $s_1$ meet the regularity assumptions discussed in remark 1.

REFERENCES

[1] P. Combes, A. K. Jebai, E Malrait, P. Martin, and P. Rouchon, "Adding virtual measurements by signal injection," in *American Control Conference*, 2016, pp. 999-1005.
[2] P. Jansen and R. Lorenz, "Transducerless position and velocity estimation in induction and salient AC machines," *IEEE Trans. Industry Applications*, vol. 31, pp. 240-247, 1995.
[3] M. Corley and R. Lorenz, "Rotor position and velocity estimation for a salient-pole permanent magnet synchronous machine at standstill and high speeds," *IEEE Trans. Industry Applications*, vol. 34, pp. 784-789, 1998.
[4] A. K. Jebai, E Malrait, P. Martin, and P. Rouchon, "Sensorless position estimation and control of permanent-magnet synchronous motors using a saturation model," *International Journal of Control*, vol. 89, no. 3, pp. 535-549, 2016.
[5] B. Yi, R. Ortega, and W. Zhang, "Relaxing the conditions for parameter estimation-based observers of nonlinear systems via signal injection," *Systems and Control Letters*, vol. 111, pp. 18-26, 2018.
[6] C. Wang and L. Xu, "A novel approach for sensorless control of PM machines down to zero speed without signal injection or special PWM technique," *IEEE Transactions on Power Electronics*, vol. 19, no. 6, pp. 1601-1607, 2004.
[7] B. Lehman and R. M. Bass, "Extensions of averaging theory for power electronic systems," *IEEE Transactions on Power Electronics*, vol. 11, no. 4, pp. 542-553, July 1996.
[8] A. Filippov, *Differential equations with discontinuous righthand sides. Control systems*, set Mathematics and its Applications. Kluwer, 1988.
[9] J. Sanders, F. Verhulst, and J. Murdock, *Averaging methods in nonlinear dynamical systems*, 2nd ed. Springer, 2005.

Sensorless Rotor Position Estimation by PWM-Induced Signal Injection

Abstract: We demonstrate how the rotor position of a PWM-controlled PMSM can be recovered from the measured currents, by suitably using the excitation provided by the PWM itself. This provides the benefits of signal injection, in particular the ability to operate even at low velocity, without the drawbacks of an external probing signal. We illustrate the relevance of the approach by simulations and experimental results.

Index Terms—Sensorless control, PMSM, signal injection, PWM-induced ripple.

Nomenclature

PWM Pulse Width Modulation
$x^{dq}$ Vector $(x^d, x^q)^T$ in the dq frame
$x^{\alpha\beta}$ Vector $(x^\alpha, x^\beta)^T$ in the $\alpha\beta$ frame
$x^{abc}$ Vector $(x^a, x^b, x^c)$ in the abc frame
$R_s$ Stator resistance
$\mathcal{J}$ Rotation matrix with angle $\pi/2$;

$$\begin{pmatrix} 0 & -1 \\ 1 & 0 \end{pmatrix}$$

I Moment of inertia
n Number of pole pairs
$\omega$ Rotor speed
$T_l$ Load torque
$\theta, \hat{\theta}$ Actual, estimated rotor position
$\phi_m$ Permanent magnet flux
$L_d, L_q$ d and q-axis inductances
C Clarke transformation:

$$\frac{2}{3}\begin{pmatrix} 1 & -1/2 & -1/2 \\ 0 & \sqrt{3}/2 & -\sqrt{3}/2 \end{pmatrix}$$

$\mathcal{R}(\theta)$ Rotation matrix with angle $\theta$:

$$\begin{pmatrix} \cos\theta & -\sin\theta \\ \sin\theta & \cos\theta \end{pmatrix}$$

$\varepsilon$ PWM period
$u_m$ PWM amplitude
$S(\theta)$ Saliency matrix
O "Big O" symbol of analysis: $k(z, \varepsilon) = O(\varepsilon)$ means $\|k(z, \varepsilon)\| \leq C\varepsilon$, for some C independent of z and $\varepsilon$.

I. Introduction

Sensorless control of AC motors in the low-speed range is a challenging task. Indeed, the observability of the system from the measurements of the currents degenerates at standstill, which limits the performance at low speed of any fundamental-model-based control law.

One now with widespread method to overcome this issue is the so-called signal injection technique. It consists in superimposing a fast-varying signal to the control law. This injection creates ripple on the current measurements which carries information on the rotor position if properly decoded. Nonetheless, introducing a fast-varying signal increases acoustic noise and may excite mechanical resonances. For systems controlled through Pulse Width Modulation (PWM), the injection frequency in moreover inherently limited by the modulation frequency. That said, inverter-friendly waveforms can also be injected to produce the same effect, as in the so-called INFORM method [1], [2]. For PWM-fed Permanent Magnet Synchronous Motors (PMSM), the oscillatory nature of the input may be seen as a kind of generalised rectangular injection on the three input voltages, which provides the benefits of signal injection, in particular the ability to operate even at low velocity, without the drawbacks of an external probing signal.

We build on the quantitative analysis developed (3) to demonstrate how the rotor position of a PWM-controlled PMSM can be recovered from the measured currents, by suitably using the excitation provided by the PWM itself. No modification of the PWM stage nor injection a high-frequency signal as in [4] is required.

The paper runs as follows: we describe in section II the effect of PWM on the current measurements along the lines of [3], slightly generalizing to the multiple-input multiple output framework. In section III, we show how the rotor position can be recovered for two PWM schemes schemes, namely standard single-carrier PWM and interleaved PWM. The relevance of the approach is illustrated in section IV with numerical and experimental results.

II. Virtual Measurement Induced by PWM

Consider the state-space model of a PMSM in the dq frame $$\frac{d\phi_s^{dq}}{dt} = u_x^{dq} - R_s i_s^{dq} - \omega \mathcal{J} \phi_s^{dq}, \tag{1a}$$

$$\frac{J}{n}\frac{d\omega}{dt} = w_x^{dq\tau} \mathcal{J} \phi_s^{dq} - T_l, \tag{1b}$$

$$\frac{d\theta}{dt} = \omega, \tag{1c}$$

where $\phi_s^{dq}$ is the stator flux linkage, $\omega$ the rotor speed, $\theta$ the rotor position, $i_s^{dq}$ the stator current, $u_s^{dq}$ the stator voltage, and $T_l$ the load torque; $R_s$, $J$, and $n$ are constant parameters (see nomenclature for notations). For simplicity we assume no magnetic saturation, i.e. linear current-flux relations $$L_d i_s^d = \phi_s^d - \phi_m \tag{2a}$$

$$L_q i_s^q = \phi_s^q, \tag{2b}$$

with $\phi_m$ the permanent magnet flux; see [5] for a detailed discussion of magnetic saturation in the context of signal injection. The input is the voltage $u_s^{abc}$ through the relation $$u_s^{dq} = \mathcal{R}(-\theta) C u_s^{abc}. \tag{3}$$

In an industrial drive, the voltage actually impressed is not directly $u_s^{abc}$, but its PWM encoding $$\mathcal{M}\left(u_s^{abc}, \frac{t}{\varepsilon}\right),$$

with $\varepsilon$ the PWM period. The function $\mathcal{M}$ describing the PWM is 1-periodic and mean $u_s^{abc}$ in the second argument, i.e. $\mathcal{M}(u_s^{abc}, \tau+1) = \mathcal{M}(u_s^{abc}, \tau)$ and $\int_0^1 \mathcal{M}(u_s^{abc}, \tau) d\tau = u_s^{abc}$; its expression is given in section III. Setting $s_0^{abc}(u_s^{abc}, \sigma) := (\mathcal{M}(u_s^{abc}, \sigma) - u_s^{abc}$, the impressed voltage thus reads $$u_{pwm}^{abc} = u_s^{abc} + s_0^{abc}\left(u_s^{abc}, \frac{t}{\varepsilon}\right),$$

where $s_0^{abc}$ is 1-periodic and zero mean in the second argument; $s_0^{abc}$ can be seen as a PWM-induced rectangular probing signal, which creates ripple but has otherwise no effect. Finally, as we are concerned with sensorless control, the only measurement is the current $i_s^{abc} = C^T \mathcal{R}(\theta)_{i_s}^{dq}$, or equivalently $i_s^{\alpha\beta} = \mathcal{R}(\theta)_{i_s}^{dq}$ since $i_s^a + i_s^b + i_s^c = 0$.

A precise quantitative analysis of signal injection is developed in [3], [6]. Slightly generalizing these results to the multiple-input multiple-output case, the effect of PWM-induced signal injection can be analyzed thanks to second-order averaging in the following way. Consider the system $$\dot{x} = f(x) + g(x)\left(u + s_0\left(u, \frac{t}{\varepsilon}\right)\right),$$

$$y = h(x),$$

where u is the control input, $\varepsilon$ is the (assumed small) PWM period, and $s_0$ is 1-periodic in the second argument, with zero mean in the second argument; then we can extract from the actual measurement y with an accuracy of order $\varepsilon$ the so-called virtual measurement (see [3], [6])

$$y_v(t) := h'(x(t))g(x(t))\mathcal{A}(u(t)),$$

i.e. we can compute by a suitable filtering process an estimate $$\widehat{y_v}(t) = y_v(t) + O(\varepsilon).$$

The matrix $\mathcal{A}$, which can be computed online, is defined by $$\mathcal{A}(v) := \int_0^1 s_1(v,\tau) s_1^T(v,\tau) d\tau,$$

where $s_1$ is the zero-mean primitive in the second argument of $s_0$, i.e.

$$s_1(v,\tau) := \int_0^1 s_0(v,\tau) d\sigma - \int_0^1 \int_0^\tau s_0(v,\sigma) d\sigma d\tau.$$

The quantity $$\varepsilon h'(x(t)) g(x(t)) s_1\left(u(t), \frac{t}{\varepsilon}\right)$$

is the ripple caused on the output y by the excitation signal $$s_0\left(u(t), \frac{t}{\varepsilon}\right);$$

though small, it contains valuable information when properly processed.

For the PMSM (1)-(3) with output $i_s^{\alpha\beta}$, some algebra yields $$y_v = \left[\mathcal{R}(\theta)\begin{pmatrix} \frac{1}{L_d} & 0 \\ 0 & \frac{1}{L_q} \end{pmatrix} \quad 0_{2\times 1} \quad \mathcal{R}'(\theta) I_{dq} \right]\begin{bmatrix} \mathcal{R}(-\theta)C \\ 0_{1\times 2} \\ 0_{1\times 2} \end{bmatrix} \mathcal{A}^{abc}(u^{abc}) =$$

$$S(\theta) C \mathcal{A}^{abc}(u^{abc}),$$

where $$\mathcal{A}^{abc}(v^{abc}) := \int_0^1 s_1^{abc}(v^{abc},\tau) s_1^{abc\tau}(v^{abc},\tau) d\tau,$$

and $S(\theta)$ is the co-called saliency matrix introduced in [5], $$S(\theta) = \frac{L_d + L_q}{2L_d L_q} \begin{pmatrix} 1 + \frac{L_q - L_d}{L_d + L_q}\cos 2\theta & \frac{L_q - L_d}{L_d + L_q}\sin 2\theta \\ \frac{L_q - L_d}{L_d + L_q}\sin 2\theta & 1 - \frac{L_q - L_d}{L_d + L_q}\cos 2\theta \end{pmatrix}.$$

If the motor has sufficient geometric saliency, i.e. if $L_d$ and $L_q$ are sufficiently different, the rotor position $\theta$ can be extracted from $y_v$ as explained in section III. When geometric saliency is small, information on $\theta$ is usually still present when magnetic saturation is taken into account, see [5].

III. Extracting $\theta$ from the Virtual Measurement

Extracting the rotor position $\theta$ from $y_v$ depends on the rank of the 2×3 matrix $C\mathcal{A}^{abc}(v^{abc})$. The structure of this matrix, hence its rank, depends on the specifies of the PWM employed. After recalling the basics of single-phase PWM, we study two cases: standard three-phase PWM with a single carrier, and three-phase PWM with interleaved carriers.

Before that, we notice that $C\mathcal{A}^{abc}(v^{abc})$ has the same rank as the 2×2 matrix $$\mathcal{A}^{\alpha\beta}(v^{abc}) := C\mathcal{A}^{abc}(v^{abc})C^T = \int_0^1 s_1^{\alpha\beta}(v^{abc}, \tau)s_1^{\alpha\beta T}(v^{abc}, \tau)d\tau,$$

where $s_1^{\alpha\beta}(v^{abc}, \tau) := Cs_1^{abc}(v^{abc}, \tau)$. Indeed, $$\mathcal{A}^{\alpha\beta}(v^{abc})\mathcal{A}^{\alpha\beta T}(v^{abc}) = C\mathcal{A}^{abc}(v^{abc})C^T C\mathcal{A}^{abc T}(v^{abc})C^T = C\mathcal{A}^{abc}(v^{abc})(C\mathcal{A}^{abc}(v^{abc}))^T,$$

which means that $\mathcal{A}^{\alpha\beta}(v^{abc})$ and $C\mathcal{A}^{abc}(v^{abc})$ have the same singular values, hence the same rank. There is thus no loss of information when considering $S(\theta)\mathcal{A}^{\alpha\beta}(u^{abc})$ instead of the original virtual measurement $y_v$.

A. Single-Phase PWM

In "natural" PWM with period $\varepsilon$ and range $[-u_m, u_m]$, the input signal $u$ is compared to the $\varepsilon$-periodic triangular carrier $$c(t) := \begin{cases} u_m + 4w\left(\frac{t}{\varepsilon}\right) & \text{if } -\frac{u_m}{2} \le w\left(\frac{t}{\varepsilon}\right) \le 0 \\ u_m - 4w\left(\frac{t}{\varepsilon}\right) & \text{if } 0 \le w\left(\frac{t}{\varepsilon}\right) \le \frac{u_m}{2} \end{cases}$$

the 1-periodic function $$w(\sigma) := u_m \mathrm{mod}\left(\sigma + \frac{1}{2}, 1\right) - \frac{u_m}{2}$$

wraps the normalized time $$\sigma = \frac{t}{\varepsilon} \text{ to } \left[-\frac{u_m}{2}, \frac{u_m}{2}\right].$$

If $u$ varies slowly enough, it crosses the carrier $c$ exactly once on each rising and falling ramp, at times $t_1^u < t_2^u$ such that $$u(t_1^u) = u_m + 4w\left(\frac{t_1^u}{\varepsilon}\right)$$

$$u(t_2^u) = u_m - 4w\left(\frac{t_2^u}{\varepsilon}\right).$$

The PWM-encoded signal is therefore given by $$u_{pwm}(t) = \begin{cases} u_m & \text{if } -\frac{u_m}{2} < W\left(\frac{t}{\varepsilon}\right) \le W\left(\frac{t_1^u}{\varepsilon}\right) \\ -u_m & \text{if } W\left(\frac{t_1^u}{\varepsilon}\right) < W\left(\frac{t}{\varepsilon}\right) \le W\left(\frac{t_2^u}{\varepsilon}\right) \\ u_m & \text{if } W\left(\frac{t_2^u}{\varepsilon}\right) < W\left(\frac{t}{\varepsilon}\right) \le \frac{u_m}{2} \end{cases}.$$

FIG. 10 illustrates the signals u, c and $u_{pwm}$. The function $$M(u, \sigma) := \begin{cases} u_m & \text{if } -2u_m < 4w(\sigma) \le u - u_m \\ -u_m & \text{if } u - u_m < 4w(\sigma) \le u_m - u \\ u_m & \text{if } u_m - u < 4w(\sigma) \le 2u_m \end{cases}$$

$$= u_m + u_m \mathrm{sign}(u - u_m - 4w(\sigma)) +$$

$$u_m \mathrm{sign}(u - u_m + 4w(\sigma)),$$

which is obviously 1-periodic and with mean u with respect to its second argument, therefore completely describes the PWM process since $$u_{pwm}(t) = M\left(u(t), \frac{t}{\varepsilon}\right).$$

The induced zero-mean probing signal is then $$s_0(u, \sigma) := M(u, \sigma) - u =$$

$$u_m - u + u_m \mathrm{sign}\left(\frac{u - u_m}{4} - w(\sigma)\right) + u_m \mathrm{sign}\left(\frac{u - u_m}{4} + W(\sigma)\right),$$

and its zero-mean primitive in the second argument is $$s_1(u, \sigma) := \left(1 - \frac{u}{u_m}\right)w(\sigma) - \left|\frac{u - u_m}{4} - w(\sigma)\right| + \left|\frac{u - u_m}{4} + w(\sigma)\right|.$$

The signals $s_0$, $s_1$ and w are displayed in FIG. 11. Notice that by construction $s_0(\pm u_m, \sigma) = s_1(\pm u_m, \sigma) = 0$, so there is no ripple, hence no usable information, at the PWM limits.

B. Three-Phase PWM with Single Carrier

In three-phase PWM with single carrier, each component $u_s^k$, k=a, b, c, of $u_x^{abc}$ is compared to the same carrier, yielding $$s_0^k(u_s^{abc}, \sigma) := s_0(u_s^k, \sigma)$$

$$s_1^k(u_s^{abc}, \sigma) := s_1(u_s^k, \sigma),$$

with $s_0$ and $s_1$ as in single-phase PWM. This is the most common PWM in industrial drives as it is easy to implement.

Notice that if exactly two components of $u_s^{abc}$ are equal, for instance $u_s^c = u_s^b \ne u_s^a$, then $$s_1^c(u_s^{abc}, \sigma) = s_1^b(u_s^{abc}, \sigma) \ne s_1^a(u_s^{abc}, \sigma),$$

which implies in turn that $\mathcal{A}^{\alpha\beta}(u^{abc})$ has rank 1 (its determinant vanishes); it can be shown this is the only situation that results in rank 1. If all three comments of $u_s^{abc}$ are equal, then $\mathcal{A}^{\alpha\beta}(u^{abc})$ has rank 0 (i.e. all its entries are zero); this is a rather exceptional condition that we rule out here. Otherwise $\mathcal{A}^{\alpha\beta}(u^{abc})$ has rank 2 (i.e. is invertible). FIG. 12 displays examples of the shape of $s_1^{\alpha\beta}$, in the rank 2 case (top), and in the rank 1 case where $u_s^c = u_s^b \neq u_s^a$.

As the rank 1 situation very often occurs, it must be handled by the procedure for extracting $\theta$ from $S(\theta)\mathcal{A}^{\alpha\beta}(u^{abc})$. This can be done by linear least squares, thanks to the particular structure of $S(\theta)$. Setting $$\begin{pmatrix} \lambda & \mu \\ \mu & \nu \end{pmatrix} := \mathcal{A}^{\alpha\beta}(u^{abc})$$

$$\begin{pmatrix} y_{11} & y_{12} \\ y_{21} & y_{22} \end{pmatrix} := \frac{2L_d L_q}{L_d + L_q} y_\nu.$$

and $$L := \frac{L_d + L_q}{L_q - L_d},$$

we can rewrite $y_\nu = S(\theta)\mathcal{A}^{\alpha\beta}(u^{abc})$ as $$\underbrace{\begin{pmatrix} \lambda & \mu \\ \mu & \nu \\ -\mu & \lambda \\ -\nu & \mu \end{pmatrix}}_{:=P} \begin{pmatrix} \cos 2\theta \\ \sin 2\theta \end{pmatrix} = L \underbrace{\begin{pmatrix} y_{11} - \lambda \\ y_{12} - \mu \\ y_{21} - \mu \\ y_{22} - \nu \end{pmatrix}}_{:=d}.$$

The least-square solution of this (consistent) overdetermined linear system is $$rCl\begin{pmatrix} \cos 2\theta \\ \sin 2\theta \end{pmatrix} = L[P^T P]^{-1} P^T d = \frac{L}{\lambda^2 + 2\mu^2 + \nu^2} P^T$$

$$d = \frac{L}{\lambda^2 + 2\mu^2 + \nu^2} \begin{pmatrix} \lambda y_{11} + \mu(y_{12} - y_{21}) - \nu y_{22} - \lambda^2 + \nu^2 \\ \lambda(y_{11} + y_{22}) + \nu y_{12} + \lambda y_{21} - 2\mu(\lambda + \nu) \end{pmatrix}.$$

Estimates $\widehat{\cos 2\theta}$, $\widehat{\sin 2\theta}$ for cos 2θ, sin 2θ are obtained with the same formulas, using instead of the actual $y_{ij}$ the estimated $$\begin{pmatrix} \widetilde{y_{11}} & \widetilde{y_{12}} \\ \widetilde{y_{21}} & \widetilde{y_{22}} \end{pmatrix} := \frac{2L_d L_q}{L_d + L_q} \widetilde{y_\nu} = \frac{2L_d L_q}{L_d + L_q} y_\nu + O(\varepsilon).$$

We thus have $$\widetilde{\cos 2\theta} := L\frac{\lambda \widetilde{y_{11}} + \mu(\widetilde{y_{12}} - \widetilde{y_{21}}) - \nu \widetilde{y_{22}} - \lambda^2 + \nu^2}{\lambda^2 + 2\mu^2 + \nu^2} = \cos 2\theta + O(\varepsilon)$$

$$\widetilde{\sin 2\theta} := L\frac{\mu(\widetilde{y_{11}} + \widetilde{y_{22}}) + \nu \widetilde{y_{12}} + \lambda \widetilde{y_{21}} - 2\mu(\lambda + \nu)}{\lambda^2 + 2\mu^2 + \nu^2} = \sin 2\theta + O(\varepsilon).$$

Finally, we get an estimate $\hat{\theta}$ of $\theta$ by $$\hat{\theta} := \tfrac{1}{2} \operatorname{atan} 2(\widetilde{\sin 2\theta}, \widetilde{\cos 2\theta}) + k\pi = \theta + O(\varepsilon),$$

where $k \in \mathbb{N}$ is the number of turns.

C. Three-Phase PWM with Interleaved Carriers

At the cost of a more complicated implementation, it turns out that a PWM scheme with (regularly) interleaved carries offers several benefits over single-carrier PWM. In this scheme, each component of $u_s^{abc}$ is compared to a shifted version of the same triangular carrier (with shift 0 for axis a, ⅓ for axis b, and ⅔ axis c), yielding $$s_0^a(u_s^{abc}, \sigma) := s_0(u_s^a, \sigma) \quad s_1^a(u_s^{abc}, \sigma) := s_1(u_s^a, \sigma)$$

$$s_0^b(u_s^{abc}, \sigma) := s_0\left(u_s^b, \sigma - \frac{1}{3}\right) \quad s_1^b(u_s^{abc}, \sigma) := s_1\left(u_s^b, \sigma - \frac{1}{3}\right)$$

$$s_0^c(u_s^{abc}, \sigma) := s_0\left(u_s^c, \sigma - \frac{2}{3}\right) \quad s_1^c(u_s^{abc}, \sigma) := s_1\left(u_s^c, \sigma - \frac{2}{3}\right).$$

FIG. 13 illustrates the principle of this scheme. FIG. 14 displays an example of the shape of $s_1^{\alpha\beta}$, which always more or less looks like two signals in quadrature.

Now, even when two, or even three, components of $u_s^{abc}$ are equal, $\mathcal{A}^{\alpha\beta}(u^{abc})$ remains invertible (except of course at the PWM limits), since each component has, because of the interleaving, a different PWM pattern. It is therefore possible to recover all four entries of the saliency matrix $S(\theta)$ by $$\widetilde{S(\theta)} := \widetilde{y_\nu} \cdot [\mathcal{A}^{\alpha\beta}(u^{abc})]^{-1} = S(\theta) + O(\varepsilon).$$

Notice now that thanks to the structure of $S(\theta) = (s_{ij})_{ij}$, the rotor angle $\theta$ be computed from the matrix entries by $$s_{12} + s_{21} = \frac{L_q - L_d}{L_d L_q} \sin 2\theta$$

$$s_{11} - s_{22} = \frac{L_q - L_d}{L_d L_q} \cos 2\theta$$

$$\theta = \frac{1}{2} \operatorname{atan} 2(s_{12} + s_{21}, s_{11} - s_{22}) + k\pi,$$

$$\theta = \tfrac{1}{2} \operatorname{atan} 2(s_{12} + s_{21}, s_{11} - s_{22}) + k\pi,$$

where $k \in \mathbb{N}$ is the number of turns. An estimate $\hat{\theta}$ of $\theta$ can therefore be computed from the entries $(\widetilde{s_{ij}})_{ij}$ of $\widetilde{S(\theta)}$ by $$\hat{\theta} = \tfrac{1}{2} \operatorname{atan} 2(\widetilde{s_{12}} + \widetilde{s_{21}}, \widetilde{s_{11}} - \widetilde{s_{22}}) + k\pi = \theta + O(\varepsilon),$$

without requiring the knowledge the magnetic parameters $L_d$ and $L_q$, which is indeed a nice practical feature.

IV. Simulations and Experimental Results

The demodulation procedure is tested both in simulation and experimentally. All the tests, numerical and experimental, use the rather salient PMSM with parameters listed in Table 1. The PWM frequency is 4 kHz.

The test scenario is the following: starting from rest at t=0 s, the motor remains there for 0.5 s, then follows a velocity ramp from 0 to 5 Hz (electrical), and finally stays at 5 Hz from t=8.5 s; during all the experiment, it undergoes a constant load torque of about 40% of the rated torque. As this paper is only concerned with the estimation of the rotor angle θ, the control law driving the motor is allowed to use the measured angle. Besides, we are not yet able to process the data in real-time, hence the data are recorded and processed offline.

TABLE 1

RATED PARAMETERS

| Rated power | 400 W |
|---|---|
| Rated voltage (RMS) | 400 V |
| Rated current (RMS) | 1.66 A |
| Rated speed | 1800 RPM |
| Rated torque | 2.12 N.m |
| Number of pole pairs n | 2 |
| Moment of inertia J | 6.28 kg.cm$^2$ |
| Stator resistance $R_a$ | 3.725 Ω |
| d-axis inductance $L_d$ | 33.78 mH |
| q-axis inductance $L_q$ | 59.68 mH |

A. Single Carrier PWM.

The results obtained in simulation by the reconstruction procedure of section III-B for cos 2θ, sin 2θ, and θ, are shown in FIG. 15 and FIG. 16. The agreement between the estimates and the actual values is excellent.

The corresponding results on experimental data are shown in FIG. 19 and FIG. 20. Though of course not as good as in simulation, the agreement between the estimates and the ground truth is still very satisfying. The influence of magnetic saturation may account for part of the discrepancies.

FIG. 17 displays a close view of the ripple envelope $s_1^{\alpha\beta}$ in approximately the same conditions as in FIG. 12 when the rank of $\mathcal{A}^{\alpha\beta}(y^{abc})$ is 2 case (top) and when the rank is 1 case with $u_s^c = u_s^b \ne u_s^a$. They illustrate that though the experimental signals are distorted, they are nevertheless usable for demodulation.

Finally, we point out an important difference between the simulation and experimental data. In the experimental measurements, we notice periodic spikes in the current measurement, see FIG. 18; these are due to the discharges of the parasitic capacitors in the inverter transistors each time a PWM commutation occurs. As it might hinder the demodulation procedure of [3], [6], the measured currents were first preprocessed by a zero-phase (non-casual) moving average with a short window length of 0.01ε. We are currently working on an improved demodulation procedure not requiring prefiltering.

B. Interleaved PWM (Simulation)

The results obtained in simulation by the reconstruction procedure of section III-C for the saliency matrix and S(θ) and for θ are shown in FIG. 21 and FIG. 22. The agreement between the estimates and the actual values is excellent. We insist that the reconstruction does not require the knowledge of the magnetic parameters.

V. Conclusion

This paper provides an analytic approach for the extraction of the rotor position of a PWM-fed PSMM, with signal injection provided by the PWM itself. Experimental and simulations results illustrate the effectiveness of this technique.

Further work includes a demodulation strategy not requiring prefiltering of the measured currents, and suitable for real-time processing. The ultimate goal is of course to be able to use the estimated rotor position inside a feedback loop.

REFERENCES

[1] M. Schroedl, "Sensorless control of ac machines at low speed and standstill based on the "inform" method," in IAS '96. *Conference Record of the 1996 IEEE Industry Applications Conference Thirty-First IAS Annual Meeting*, vol. 1, 1996, pp. 270-277 vol. I.

[2] E. Robeischl and M. Schroedl, "Optimized inform measurement sequence for sensorless pm synchronous motor drives with respect to minimum current distortion," *IEEE Transactions on Industry Applications*, vol. 40, no. 2, 2004.

[3] D. Surroop, P. Combes, P. Martin, and P. Rouchon, "Adding virtual measurements by pwm-induced signal injection," in 2020 *American Control Conference (ACC)*, 2020, pp. 2692-2698.

[4] C. Wang and L. Xu, "A novel approach for sensorless control of PM machines down to zero speed without signal injection or special PWM technique," *IEEE Transactions on Power Electronics*, vol. 19, no. 6, pp. 1601-1607, 2004.

[5] A. K. Jebai, F. Malrait, P. Martin, and P. Rouchon, "Sensorless position estimation and control of permanent-magnet synchronous motors using a saturation model," *International Journal of Control*, vol. 89, no. 3, pp. 535-549, 2016.

[6] P. Combes, A. K. Jebai, F. Malrait, P. Martin, and P. Rouchon, "Adding virtual measurements by signal injection," in *American Control Conference*, 2016, pp. 999-1005.

The present disclosure also relates to the following subject-matter:

Clause 1: A method for controlling an actuator, comprising providing a control signal for the actuator and modulating the control signal by a modulation signal.

Clause 2: The method of clause 1, further comprising determining a zero-mean primitive of the modulated control signal, obtaining measurement signals from the actuator, obtaining virtual measurements by demodulating the measurement signals based on the zero-mean primitive of the modulated control signal, adapting the control signal in response to the obtained virtual measurements.

Clause 3: The method of clause 1 or 2, wherein the modulation signal comprises pulse-width modulation.

Clause 4: The method of any one of clauses 1 to 3, wherein the actuator is an electric motor.

Clause 5: A control system for controlling an actuator, comprising a control module generating a control signal, a PWM-module generating a modulated control signal by pulse-width modulation and a zero-mean primitive of the modulated control signal, a measurement unit for obtaining measurement signals from the actuator, and an estimator module for obtaining virtual measurements by demodulating the measurement signals based on the zero-mean primitive of the modulated control signal, wherein the control module is arranged for adapting the control signal based on feedback in the form of the obtained virtual measurements.

Clause 6: The system of clause 5, wherein the modulation signal comprises pulse-width modulation.

Clause 7: The system of clause 5 or 6, wherein the actuator is an electric motor.

This disclosure is not limited to the specific embodiments described here, which are only examples. The invention encompasses every alternative that a person skilled in the art would envisage when reading this text.

The invention claimed is:

1. A variable speed drive for the closed loop control of the operation of an AC electric motor based on a given control law, the variable speed drive comprising:

an output terminal for delivering a controlled alternating drive voltage (upwm) to the controlled AC electric motor;

a solid-state power inverter for generating the drive voltage;

a drive controller for controlling the generation of the drive voltage by the power inverter; and a drive current sensing device for measuring the instantaneous intensity of the drive current taken up by the controlled AC electric motor and for providing the resulting measurements as a drive current intensity signal to the drive controller, wherein the drive controller includes:

a pulse-width modulation generator;

a control law module storing the given control law; and a state variable estimation module for estimating the instantaneous value of at least one state variable of the controlled AC electric motor, wherein the control law module is adapted to, based on the stored control law and state variable estimates provided by the estimation module, compute a target voltage signal and output the computed target voltage signal to the pulse-width modulation generator, wherein the pulse-width modulation generator is adapted to:

approximate the received target voltage signal with a pulse-width modulated inverter control signal;

control the operation of the power inverter using the inverter control signal, thereby obtaining the drive voltage;

compute, based on the deviation between the inverter control signal and the target voltage signal, a state variable estimation support signal; and output the computed state variable estimation support signal to the state variable estimation module, and wherein the state variable estimation module is adapted to:

estimate the instantaneous value of a state variable of the AC electric motor based on the received state variable estimation support signal and the drive current intensity signal provided by the drive current sensing device; and output the resulting state variable estimate to the control law module.

2. The variable speed drive of claim 1, wherein the pulse-width modulation generator is adapted to compute the state variable estimation support signal based on a pulse-width modulation inherent disturbance signal, which is obtained by subtracting the target voltage signal from the inverter control signal.

3. The variable speed drive of claim 2, wherein the pulse-width modulation generator is adapted to compute the state variable estimation support signal by integrating the disturbance signal to obtain the primitive of the disturbance signal.

4. The variable speed drive of claim 1, wherein the variable speed drive is adapted to rely on a single feedback to perform closed loop control of the AC electric motor, namely the drive current intensity signal provided by the drive current sensing device.

5. The variable speed drive of claim 1, wherein the variable speed drive is adapted to control the operation of the AC electric motor without the injection of a dedicated probing signal into the drive voltage.

6. The variable speed drive of claim 1, wherein the drive controller further includes an analog-to-digital converter for converting the drive current intensity signal into a digital signal prior to its input into the state variable estimation module.

7. The variable speed drive of claim 1, wherein the state variable estimation module is adapted to estimate the instantaneous value of the rotor position of the electric motor based on the received state variable estimation support signal and the drive current intensity signal provided by the drive current sensing device.

8. The variable speed drive of claim 1, wherein the pulse-width modulation generator is adapted to apply three-phase pulse-width modulation with single carrier to generate the inverter control signal.

9. The variable speed drive of claim 1, wherein the pulse-width modulation generator is adapted to apply three-phase pulse-width modulation with interleaved carriers to generate the inverter control signal.

10. An electric drive assembly comprising a synchronous reluctance motor and a variable speed drive of claim 1 for controlling the synchronous reluctance motor.

11. An electric drive assembly comprising a permanent-magnet synchronous motor and a variable speed drive of claim 1 for controlling the permanent-magnet synchronous motor.

12. A method of controlling, in a closed loop, the operation of an AC electric motor based on a given control law, the method comprising the following steps:

a) measuring the instantaneous intensity of the drive current taken up by the controlled AC electric motor;

b) estimating the instantaneous value of a state variable of the AC electric motor using the measured drive current intensity;

c) computing, based on the given control law and the estimated state variable, a target voltage signal;

d) approximating the computed target voltage signal with a pulse-width modulated inverting control signal;

e) computing, based on the deviation between the inverting control signal and the target voltage signal, a state variable estimation support signal;

f) generating, by voltage inversion, a controlled alternating drive voltage using the inverting control signal; and g) delivering the generated drive voltage to the controlled AC electric motor;

wherein the state variable estimation according to step b) relies on the state variable estimation support signal computed in step e) as an additional input together with the drive current intensity measured in step a).

* * * * *